TIME-BANDWIDTH REDUCTION BY DIVIDING BINARY TYPE SIGNAL INTO GROUPS AND PRODUCING CODED SIGNAL OF PREDETERMINED CHARACTERISTIC IN RESPONSE TO EACH GROUP

Filed Dec. 28, 1964 12 Sheets-Sheet 1

| GROUP | SAMPLE 1. | SAMPLE 2. | TRANSMISSION CHARACTERISTIC | LEVEL CODE |
|---|---|---|---|---|
| I | B (1) | B (1) | A (11) | 4 |
| II | W(0) | W(0) | B (00) | 1 |
| III | W(0 | B (1) | C (01) | 2 |
| IV | W(0 | B (1) | C (01) | 2 |
| V | B(1) | W(0) | D (10) | 3 |
| VI | W(0) | W(0) | B (00) | 1 |

INVENTOR
ROBERT V. QUINLAN
BY Hood, Gust & Irish
ATTORNEYS

INVENTOR
ROBERT V. QUINLAN
BY Hood, Gust & Irish
ATTORNEYS

Dec. 3, 1968 R. V. QUINLAN 3,414,677

TIME-BANDWIDTH REDUCTION BY DIVIDING BINARY TYPE SIGNAL INTO GROUPS AND PRODUCING CODED SIGNAL OF PREDETERMINED CHARACTERISTIC IN RESPONSE TO EACH GROUP

Filed Dec. 28, 1964 12 Sheets-Sheet 3

INVENTOR
ROBERT V. QUINLAN

BY Hood, Gust & Irish

ATTORNEYS

INVENTOR
ROBERT V. QUINLAN
BY Hood, Gust & Irish
ATTORNEYS

Dec. 3, 1968 R. V. QUINLAN 3,414,677
TIME-BANDWIDTH REDUCTION BY DIVIDING BINARY TYPE SIGNAL INTO GROUPS AND PRODUCING CODED SIGNAL OF PREDETERMINED CHARACTERISTIC IN RESPONSE TO EACH GROUP
Filed Dec. 28, 1964 12 Sheets-Sheet 5

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

Dec. 3, 1968 R. V. QUINLAN 3,414,677

TIME-BANDWIDTH REDUCTION BY DIVIDING BINARY TYPE SIGNAL INTO GROUPS AND PRODUCING CODED SIGNAL OF PREDETERMINED CHARACTERISTIC IN RESPONSE TO EACH GROUP

Filed Dec. 28, 1964 12 Sheets-Sheet 8

INVENTOR
ROBERT V. QUINLAN

BY Hood, Gust & Irish

ATTORNEYS

| GROUP | SAMPLE LEVEL 1. | SAMPLE LEVEL 2. | ONE-HALF OF SECOND SAMPLE | SUM OF FIRST SAMPLE AND HALF SECOND SAMPLE | LEVEL |
|---|---|---|---|---|---|
| I | 2 | 2 | 1 | 3 | 4 |
| II | 0 | 0 | 0 | 0 | 1 |
| III | 0 | 2 | 1 | 1 | 2 |
| IV | 0 | 2 | 1 | 1 | 2 |
| V | 2 | 0 | 0 | 2 | 3 |
| VI | 0 | 0 | 0 | 0 | 1 |

| GROUP | SAMPLE 1. | SAMPLE 2. | SAMPLE 3. | TRANSMISSION CHARACTERESTIC |
|---|---|---|---|---|
| I | B | B | B | A |
| II | W | W | W | B |
| III | W | B | B | C |
| IV | W | B | B | C |
| V | B | B | W | D |
| VI | W | W | W | B |
| | W | W | B | E |
| | B | W | W | F |
| | B | W | B | G |
| | W | B | W | H |

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

United States Patent Office 3,414,677
Patented Dec. 3, 1968

3,414,677

TIME-BANDWIDTH REDUCTION BY DIVIDING BINARY TYPE SIGNAL INTO GROUPS AND PRODUCING CODED SIGNAL OF PREDETERMINED CHARACTERISTIC IN RESPONSE TO EACH GROUP

Robert V. Quinlan, Fort Wayne, Ind., assignor to International Telephone and Telegraph Corporation, Nutley, N.J., a corporation of Delaware Filed Dec. 28, 1964, Ser. No. 421,308
14 Claims. (Cl. 179—15.55)

ABSTRACT OF THE DISCLOSURE

A binary type signal is divided into successive groups of plural binary elements with the plural elements of each group being simultaneously sampled to produce one coded signal unit in response to each group having a duration equal to the duration of the groups and a characteristic (amplitude, frequency or the like) determined by the binary state and sequence of binary states of the sampled elements. The coded signal unit is transmitted to a receiver and decoded according to its characteristic to recover the original binary type signal.

This invention relates generally to information transmission systems and methods, and more particularly to systems and methods for reducing the transmission time and/or bandwidth of pulsed electrical signals employed in information transmissions systems.

Time-based pulsed electrical signals are utilized in certain information transmission systems including data transmissions systems, and television systems for transmitting black and white copy; conventional data transmission systems employ binary pulses of fixed duration in coded sequences whereas conventional television systems for transmitting black and white copy employ binary pulses of varying duration. In both types of information transmission systems, it is generally desirable to provide minimum transmission time. Since pulse width is the reciprocal of bandwidth, and pulse width is in turn directly proportional to the transmitting speed in the case of data transmission systems and to the scanning speed in the case of television systems, transmission of binary coded data at the requisite high speed and transmission of the minimum size picture element at conventional scanning rates with optimum resolution has involved a wide band of signal frequencies, thus in turn necessitating employment of a wide band transmission facility such as a micro-wave radio link or coaxial cable. Such wide band transmission facilities are, however, expensive and further are not always readily available or feasible and thus, there are many instances where it is desirable to transmit such information-conveying pulsed signals over narrow band facilities such as ordinary telephone lines. In the case of binary coded data transmission systems, this has required operation of the transmitting apparatus at a correspondingly low speed and has necessitated the employment of slow scanning rates in the case of television systems.

In order to provide faster transmission rates, various bandwidth compression techniques have been proposed in which a predetermined amount of redundant information in the initial binary pulsed signal is detected and transmitted as a single signal element. However, such bandwidth compression techniques actually transmit less information than is contained in the initial signal with an accompanying loss in resolution. It is therefore desirable to provide a system and method for reducing the transmission time and/or bandwidth of a pulsed information-conveying signal which does not suffer the loss of resolution encountered in prior bandwidth compression systems and methods.

In accordance with the broader aspects of the invention, the amplitude levels or states of adjacent elements of successive groups of elements of the initial signal are sampled and a signal unit is generated in response to each one of the groups of elements, each of the coded signal units having a different predetermined characteristic in response to a different combination of the amplitude levels of the sampled elements of a respective group; such coded signal unit characteristics may be different amplitude levels, different frequencies, or different phases in the transmitted signal. At the receiving station, the coded signal units are decoded to reconstruct the initial signal. Thus, assuming that the initial signal is divided into successive elements respectively having durations no greater than the minimum duration of a signal pulse, and that these elements are grouped in successive groups of two, it will be seen that each group of two signal elements may have only one of four different combinations of signal amplitude levels, i.e., "black-black" (A), "white-white" (B), "white-black" (C), and "black-white" (D). Therefore, transmission of coded signal pulses respectively having the same duration as a group of initial signal elements, e.g., two elements in the assumed example, and respectively having different transmission characteristics in response to the four different combinations of amplitude levels in each group of two signal elements, will result in a transmission signal in which the minimum pulse width is twice the minimum pulse width in the initial signal. Thus, it will be readily seen that transmission time can be doubled while maintaining the same bandwidth as that provided by the initial signal or the bandwidth can be reduced by half while retaining the same transmission rate. It will also be seen that the transmission time or bandwidth reduction can be further increased by increasing the number of initial signal elements sampled in each group with the coding characteristics increasing by the factorial of the number of elements sampled in each group, i.e., if three initial signal elements are sampled in each group (with each element having a duration no greater than the minimum pulse duration in the initial signal), the transmission time or bandwidth is reduced by a factor of three with eight coding characteristics being required, with four signal elements being sampled in each group (and with each element again having a duration no longer than the minimum pulse duration of the initial signal), the transmission time or bandwidth is reduced by a factor of four with sixteen coding characteristics being required, etc.

It is accordingly an object of the invention to provide an improved time-bandwidth reduction system.

Another object of the invention is to provide an improved method of time-bandwidth reduction.

A further object of the invention is to provide an improved system and method of time-bandwidth reduction for use in a pulse-type information transmission system.

Yet another object of the invention is to provide an improved system and method of time-bandwidth reduction employing a multi-characteristic coded transmission signal for use in a pulsed type information transmission system.

The above mentioned and other features and objects of this invention and the manner of attaining them will become more apparent and the invention itself will be best understood by reference to the following description of an embodiment of the invention taken in conjunction with the accompanying drawings, wherein.

Figure 3:
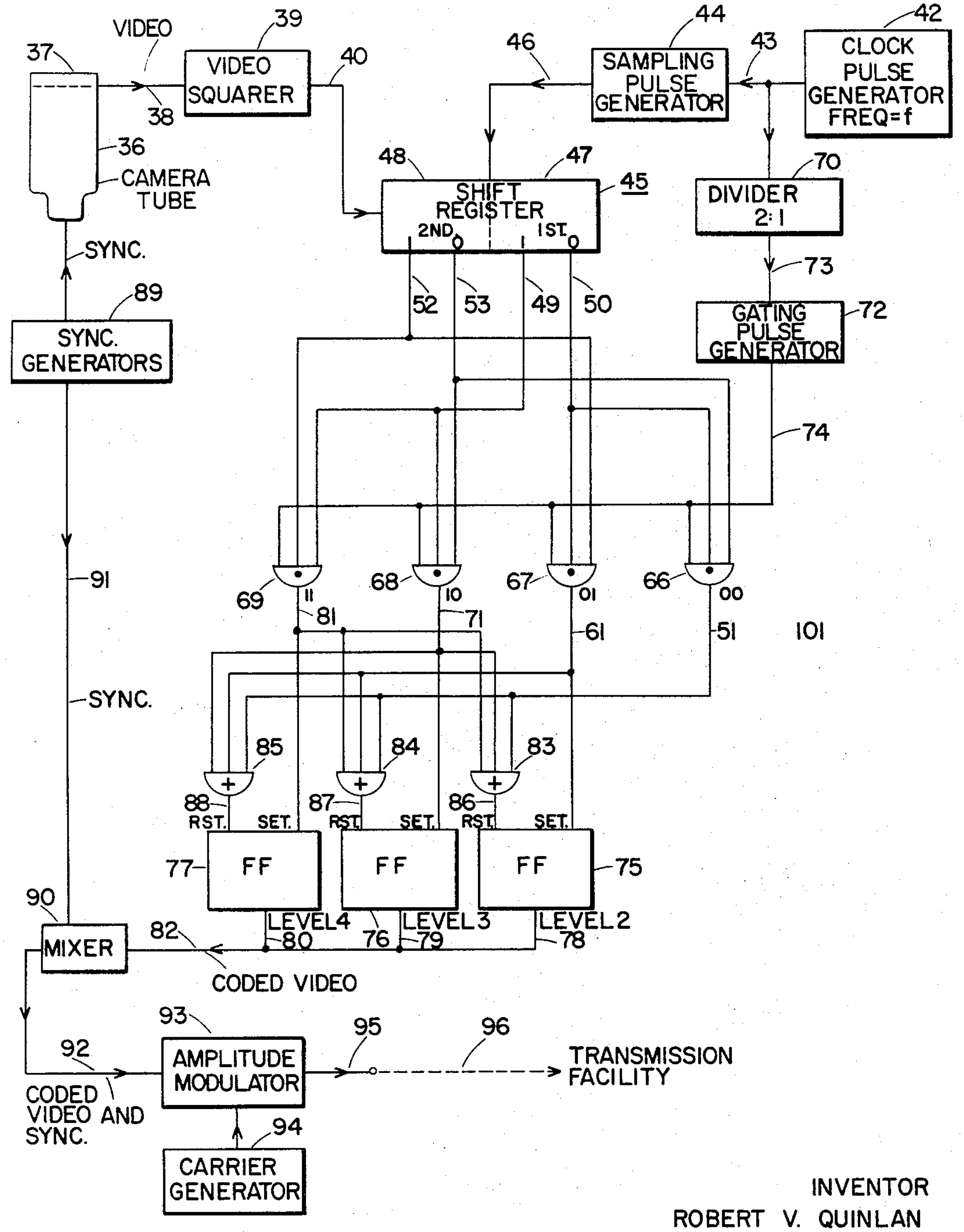
FIG. 3 is a scematic diagram showing one embodiment of the encoding apparatus of the invention employed in a television system.
Figure 5:
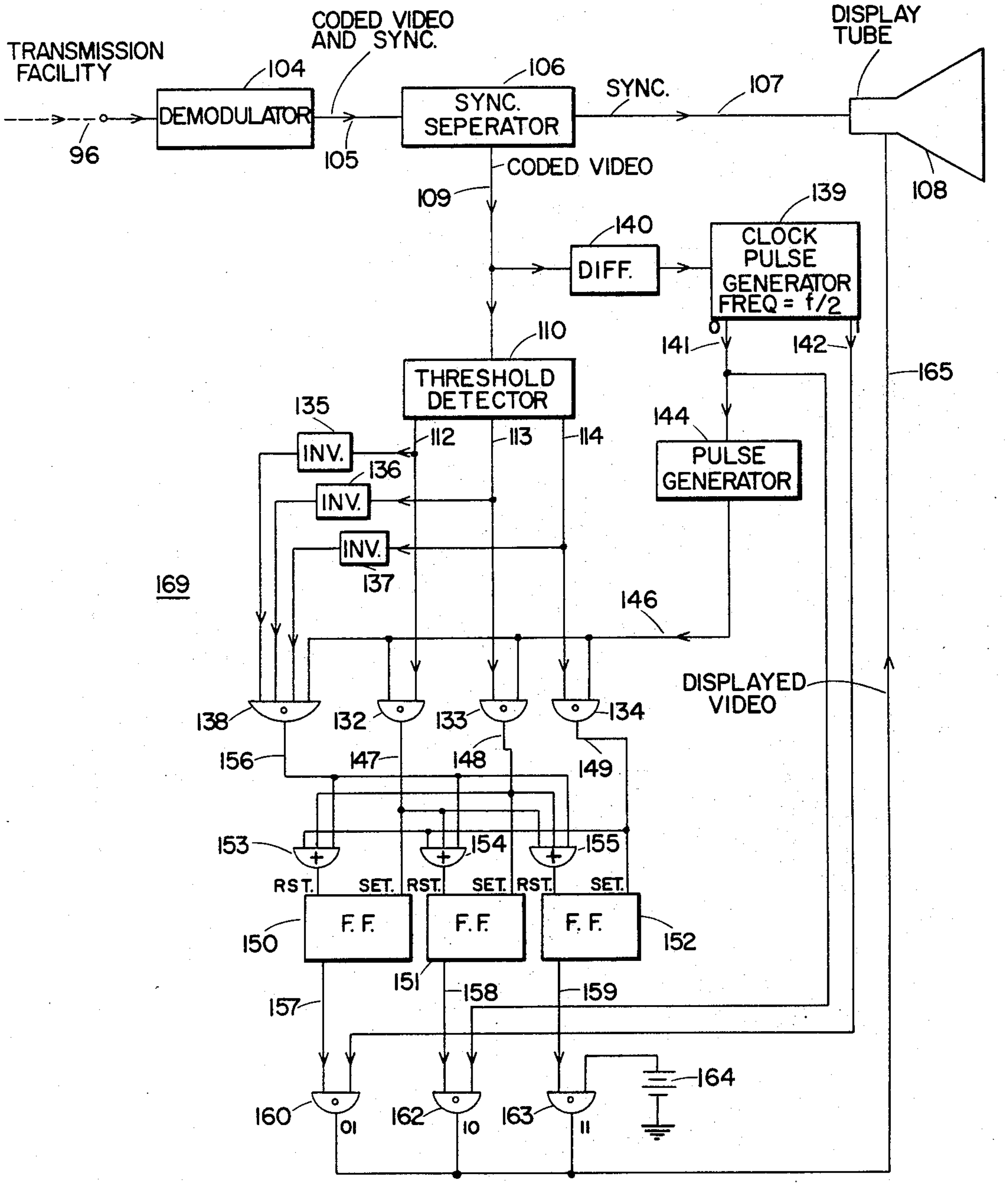
FIG. 5 is a schematic diagram showing one embodiment of the decoding apparatus of the invention incorporated in a television system.
Figure 7:
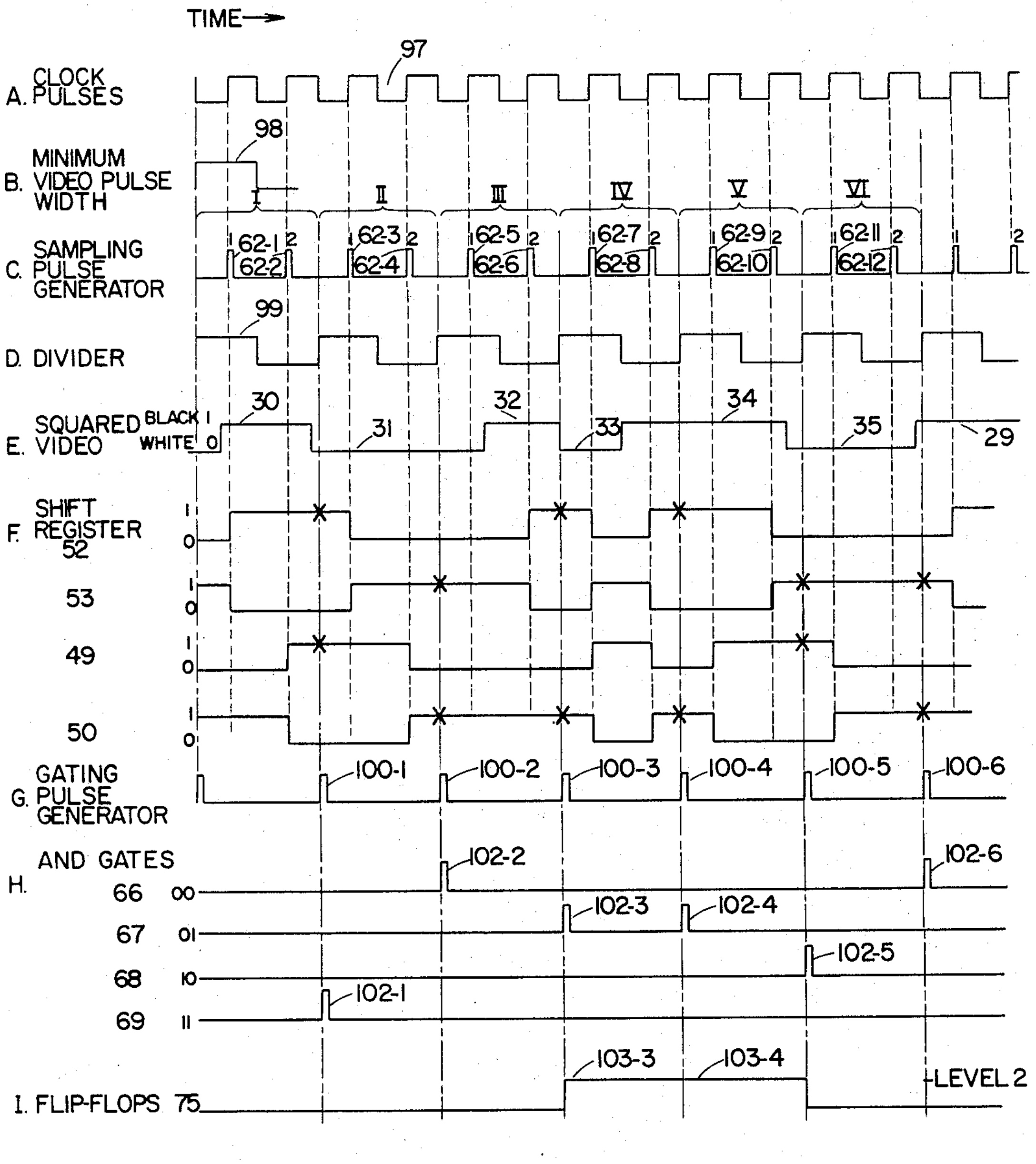
Figure 7A:
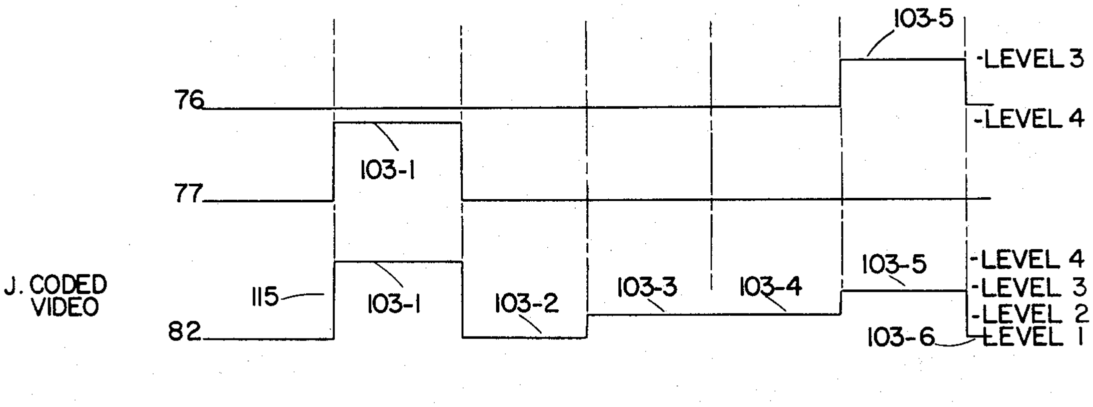
Figure 9:
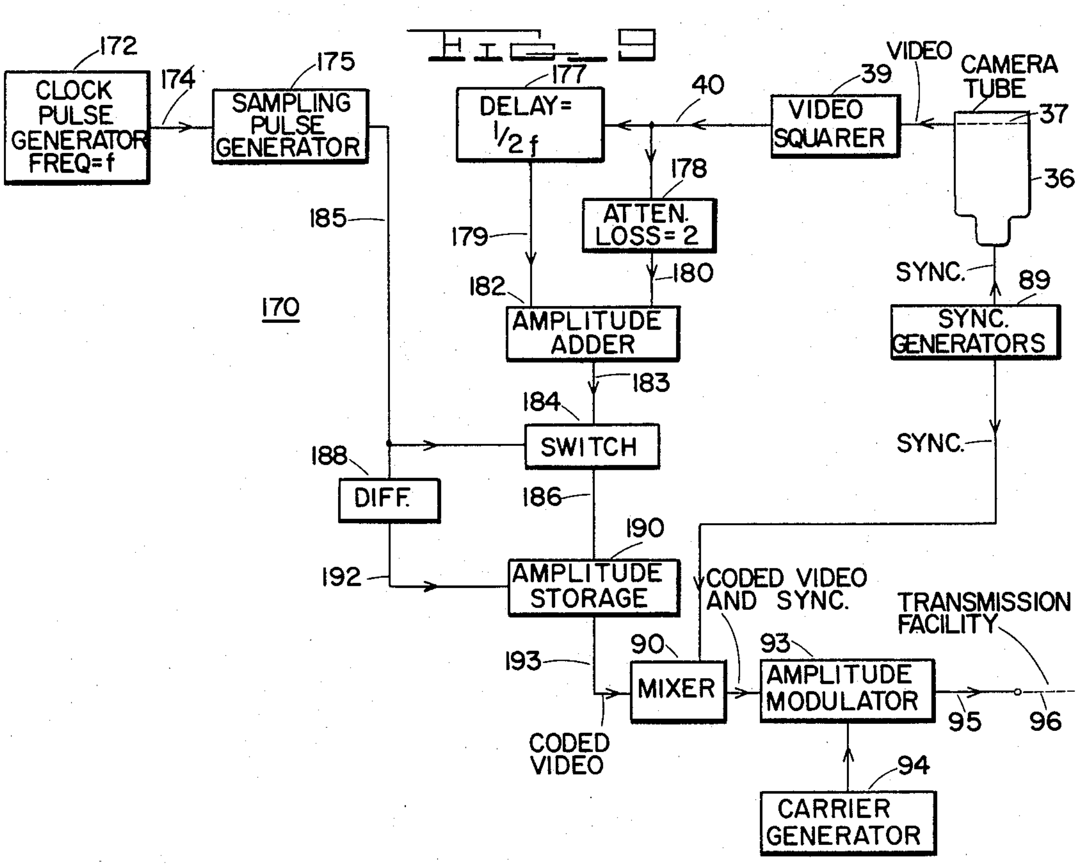
Figure 8:
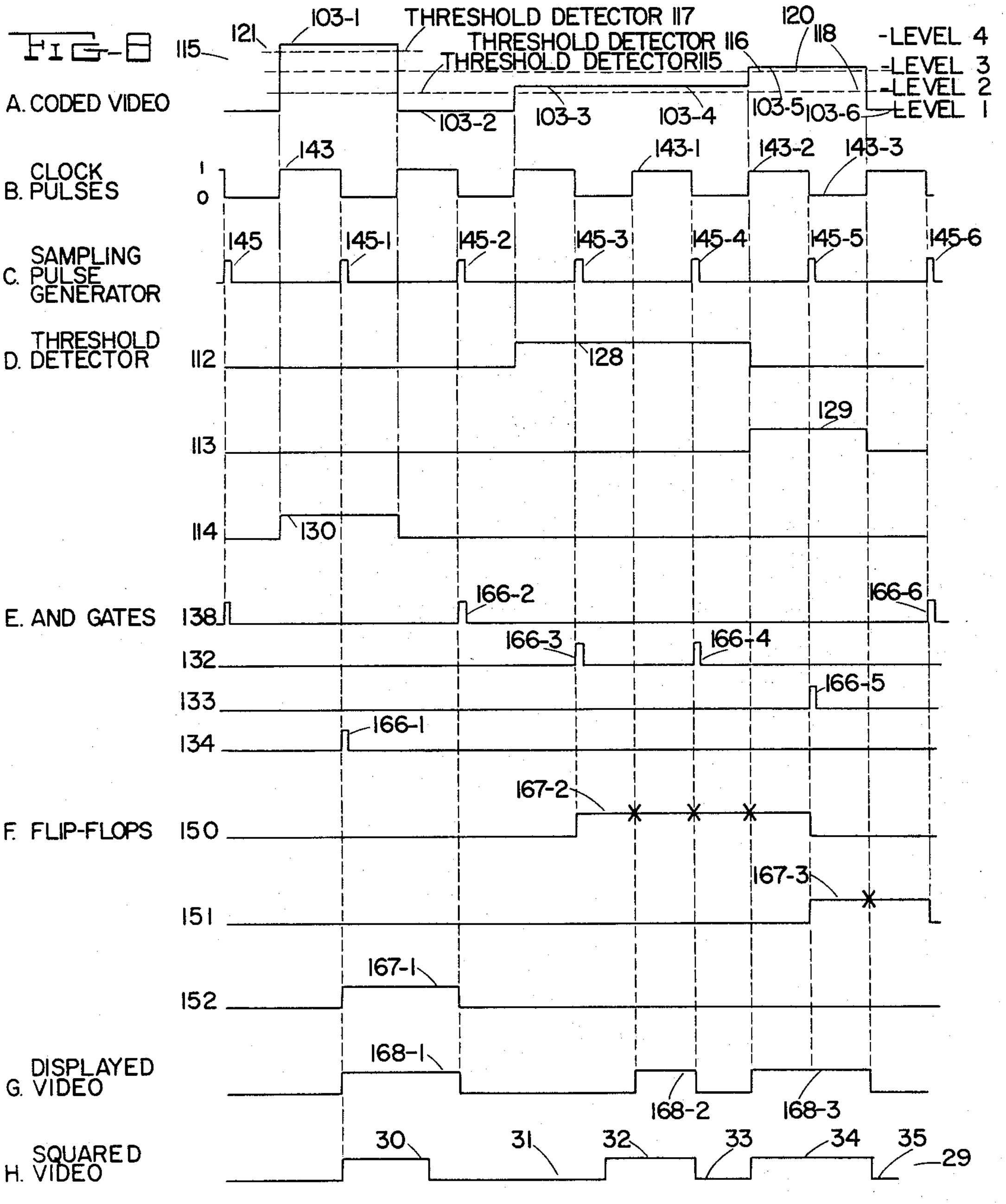
Figure 10:
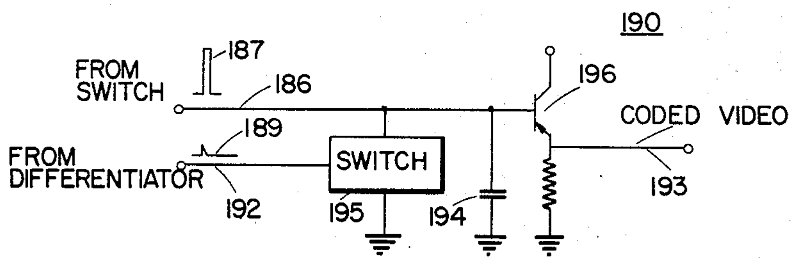
Figure 11:
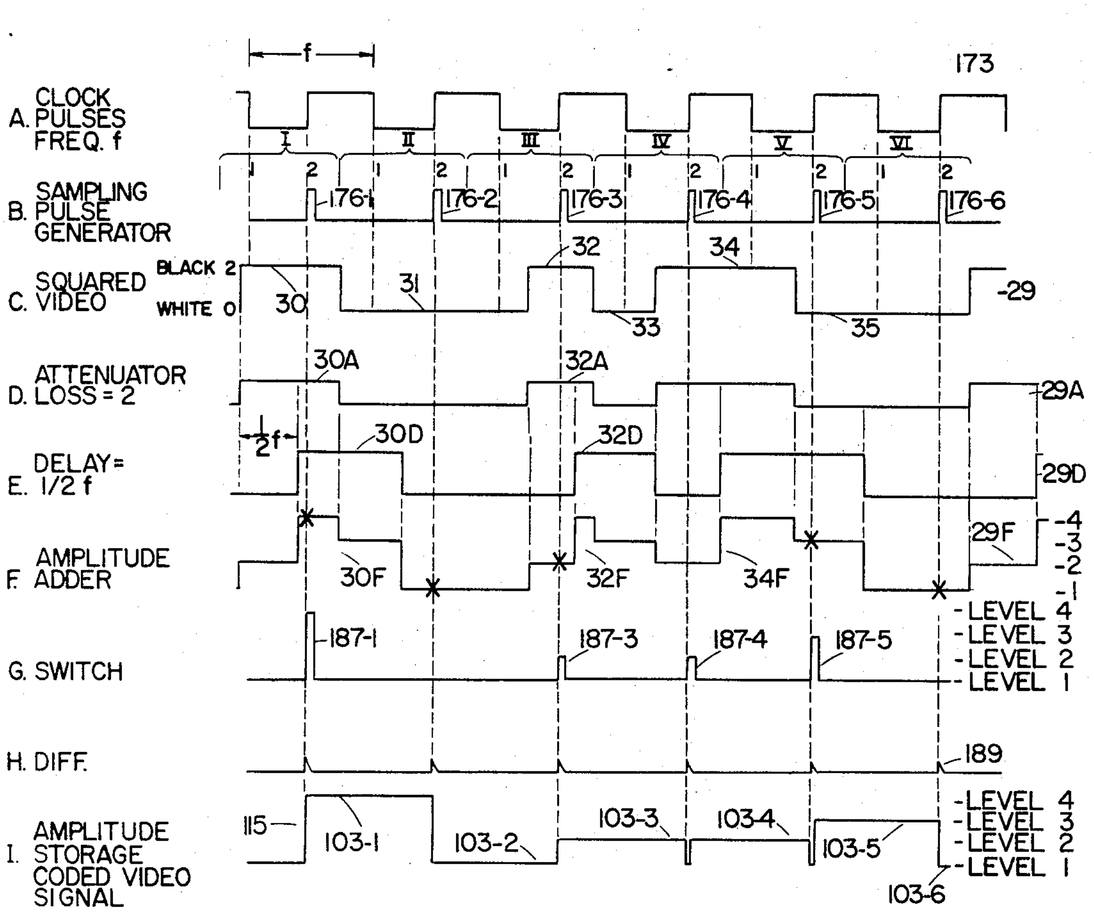
Figures 12, 13, 14:
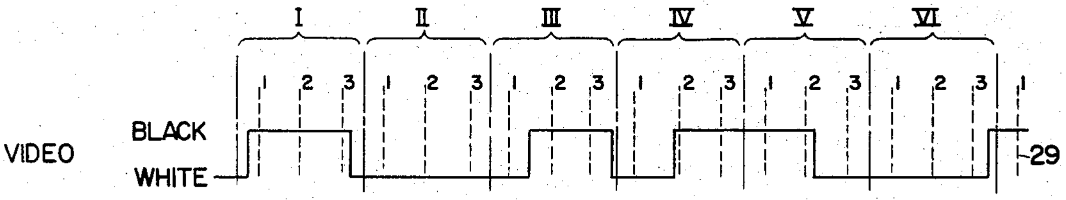
Figure 16:
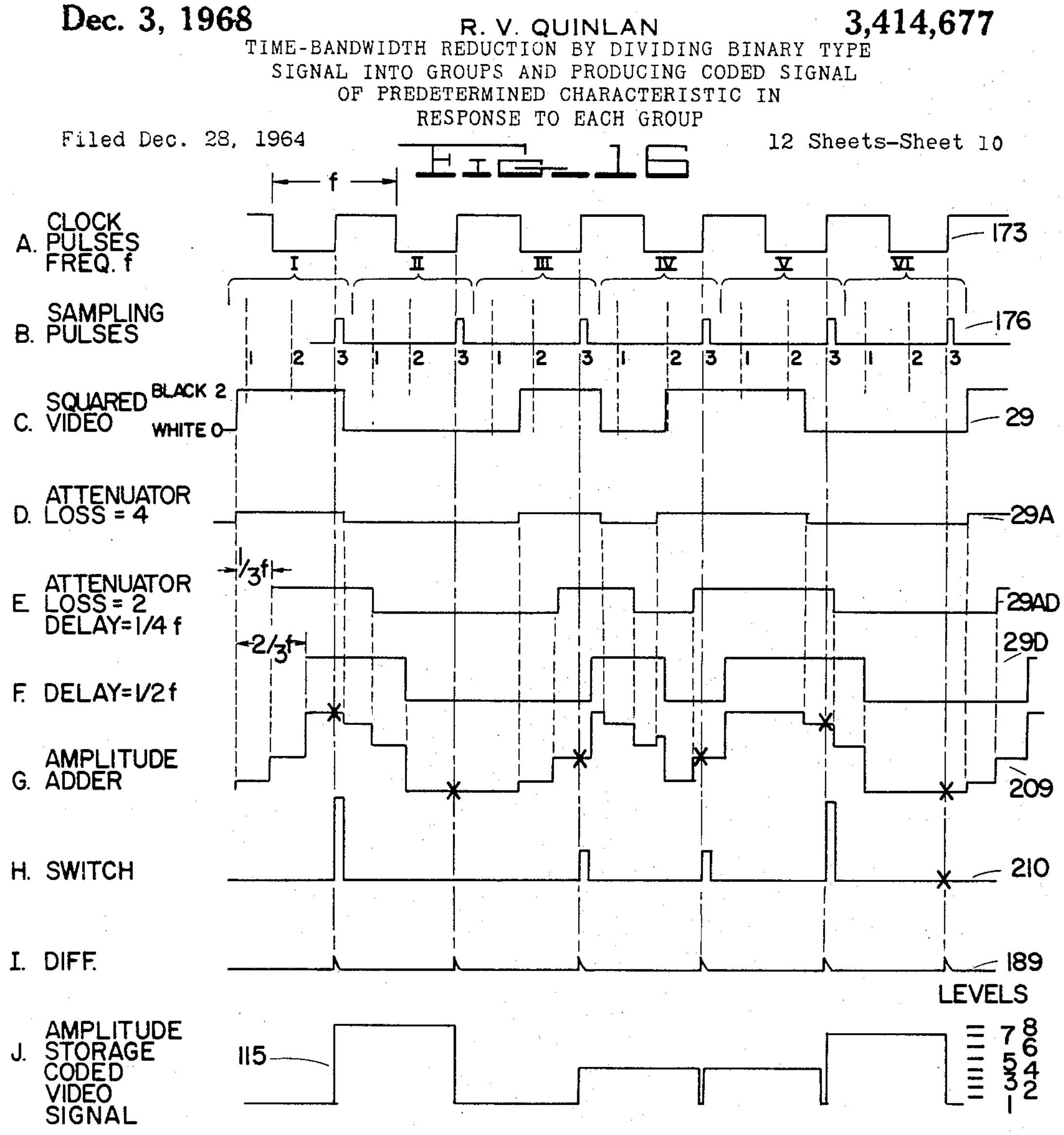
Figure 15:
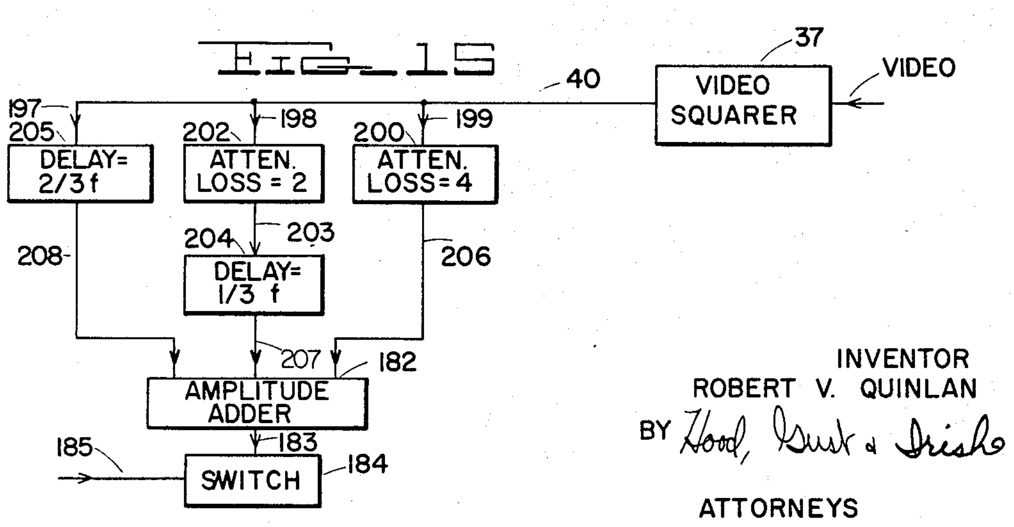
Figure 17:
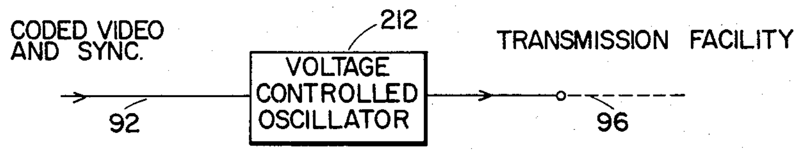
Figure 18:
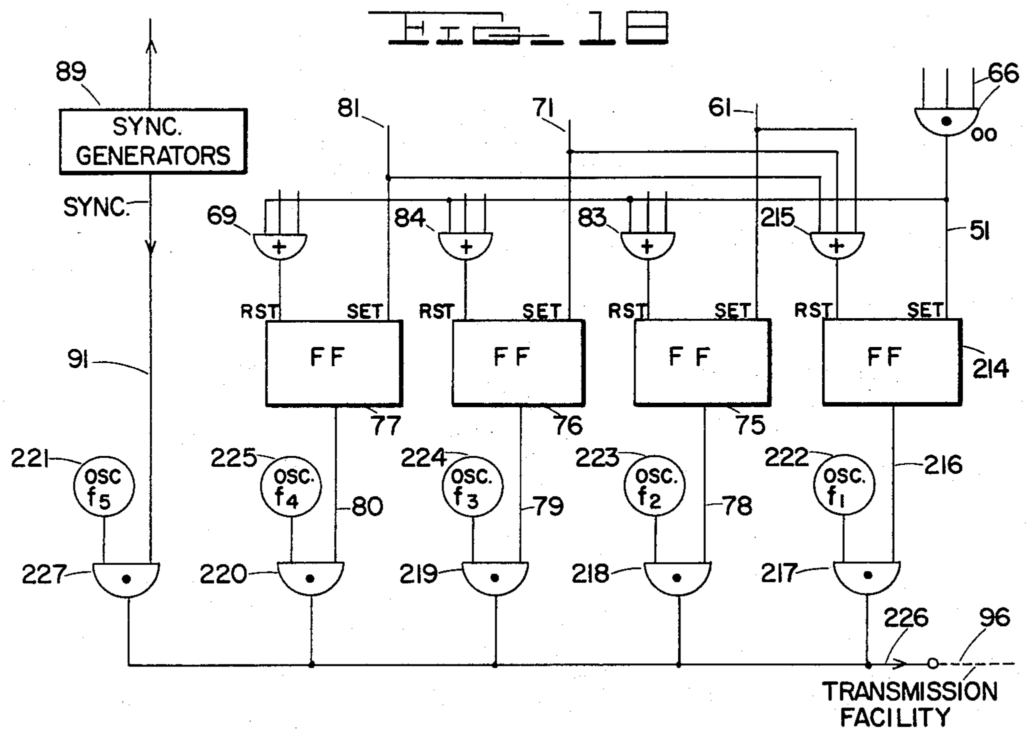
Figure 19:
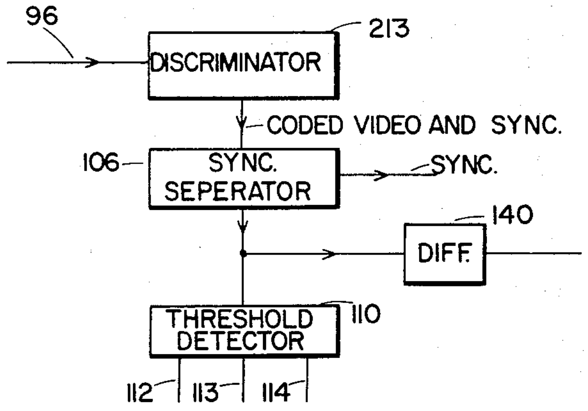
Figure 20:
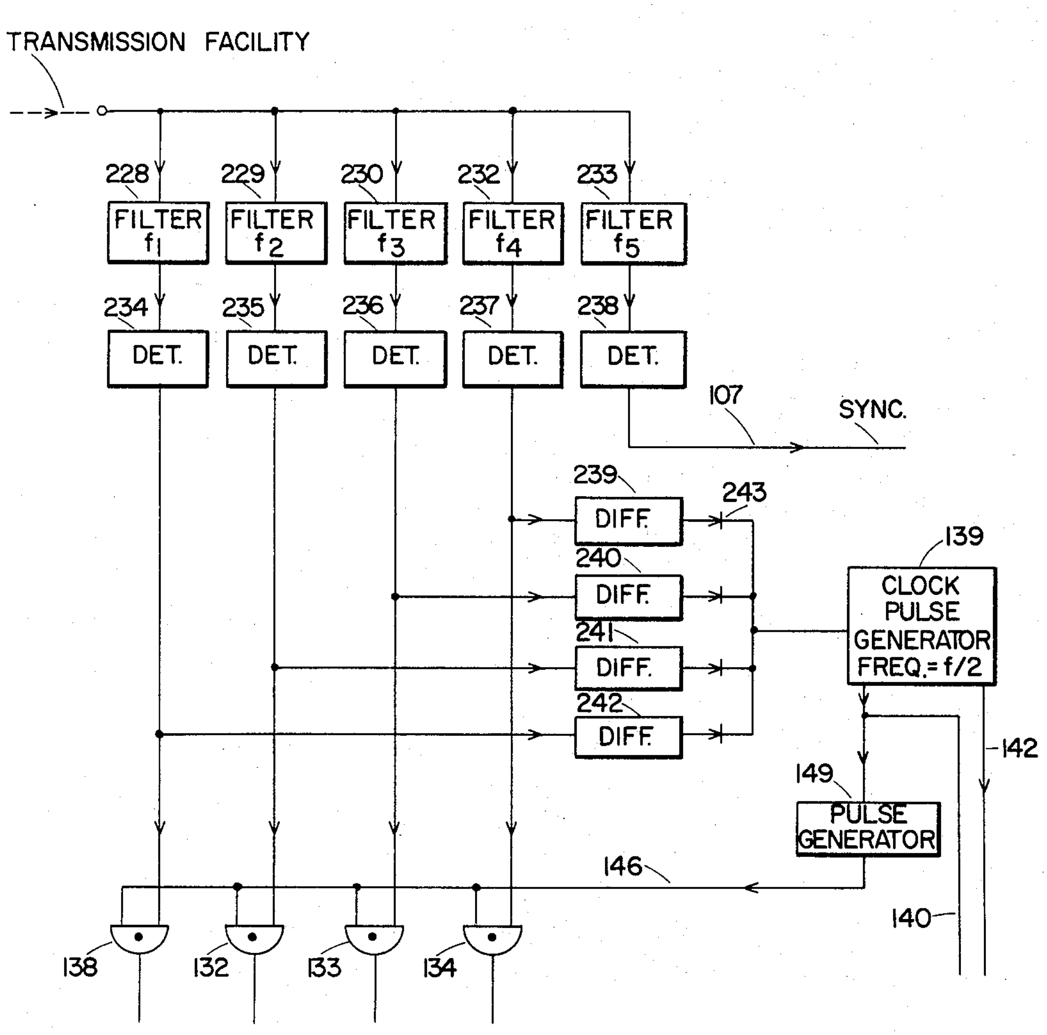

FIGS. 7 and 7*a* are a diagram showing the various pulses provided in the encoding apparatus of FIG. 3;

FIG. 8 is a diagram showing the various pulses provided in the decoding apparatus of FIG. 5;

FIG. 9 is a schematic diagram showing another embodiment of the encoding apparatus of the invention employed in a television system;

FIG. 10 is a schematic diagram showing an amplitude storage circuit which may be employed in the apparatus of FIG. 9;

FIG. 11 is a diagram showing the pulses found in the system of FIG. 9;

FIG. 12 is a chart useful in conjunction with FIG. 11;

FIG. 13 is a diagram showing a binary pulsed video signal divided into successive groups of three signal elements;

FIG. 14 is a chart useful in conjunction with FIG. 13;

FIG. 15 is a fragmentary schematic diagram showing a modification of the embodiment of FIG. 9 to provide sampling of successive groups of three signal elements;

FIG. 16 is a diagram showing the pulses found in the system of FIG. 15;

FIG. 17 is a fragmentary schematic diagram showing a modification of the systems of FIGS. 3 and 9 to provide coded transmission signal characteristics by frequency shifting;

FIG. 18 is a fragmentary schematic diagram showing another modification of the system of FIG. 3 to provide coded transmission signal characteristics by frequency shifting;

FIG. 19 is a fragmentary schematic diagram showing modification of the system of FIG. 5 for decoding the frequency shifted transmission signals provided by the systems of FIG. 17 and FIG. 18; and FIG. 20 is a fragmentary schematic diagram showing another modification of the system of FIG. 5 for decoding frequency shifted transmission signals.

Figures 1, 2:
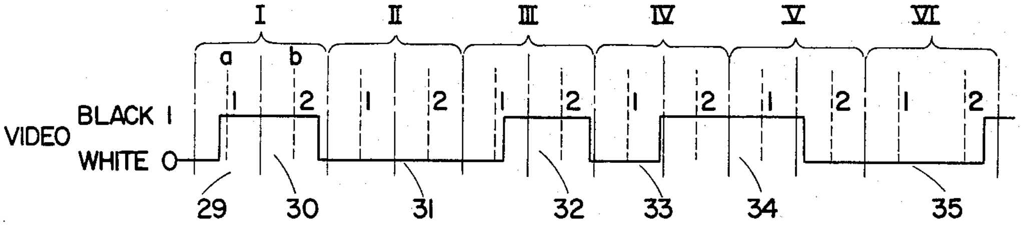
FIG. 1 is a diagram showing a typical binary pulsed video signal divided into successive groups of two signal elements and useful in explaining the invention.
FIG. 2 is a chart showing the combinations of amplitude levels and corresponding transmission characteristics of FIG. 1.

Referring now to FIG. 1, a typical binary pulsed video signal is shown of the type provided in a television system transmitting black and white (or any other two contrasting colors) information; it will be recognized that the video signal shown in FIG. 1 has been processed by a conventional squaring circuit to transform the gradual transitions in the output signal from the camera tube between the black and white levels into square pulses of varying duration. Here, it has been assumed that the "black" level signals are positive-going and thus the "black" signals have been assigned the binary number "one" and the "white" level signals have been assigned the binary number "zero." It will be seen that the video signal shown is formed of "black" level pulses 30, 32, 34 and "white" level pulses 31, 33 and 35. "White" level pulse 33 is assumed to be a pulse having the minimum width, i.e., duration, provided by the system. Therefore, if the video signal shown in FIG. 1 were to be transmitted over conventional transmission facilities, the bandwidth of the facility would be required to be sufficiently broad to accommodate the minimum width pulse 33.

In accordance with the invention, the video signal shown in FIG. 1 is divided into successive groups I, II, III, IV, V and VI of two signal elements respectively identified as *a* and *b*. The signal elements *a* and *b* of each group of elements I, II, et seq. are of equal duration and, for a reason to be hereinafter described, have a duration no longer than the duration of the minimum width video pulse 33. Referring now additionally to FIG. 2, it will be assumed that each successive elements *a* and *b* of each successive group I, II, et seq. of elements of the video signal has its amplitude level or state sampled at the middle of each respective element, as indicated by the dashed lines, respectively identified as 1 and 2 in FIG. 1. It will thus be seen that the sampling interval, i.e., the duration between the samples 1 and 2 of each group I, II, et seq. are equally time-spaced of the same interval as the duration of the signal elements *a* and *b*, and thus in turn that the sampling interval is no longer than the width or duration of the minimum width pulse 33. The maximum sampling interval is provided in order to insure that the amplitude level or state of each video signal pulse is sampled at least once during the occurrence of the pulse; if the sampling interval were longer than the minium pulse width, it is possible that a particular video signal pulse would not be sampled at all thus resulting in loss of resolution.

Referring still to FIGS. 1 and 2, it will be seen that samples 1 and 2 of Group I detect two "black" elements (a binary 1–1) that samples 1 and 2 of Group II detect two "white" elements (0–0), that samples 1 and 2 of Group III detect a "white" element followed by a "black" element (0–1), that samples 1 and 2 of Group IV likedetect a white element followed by a black element (0–1), that samples 1 and 2 of Group V detect a "black" element followed by a "white" element (1–0) and finally that samples 1 and 2 of Group VI detect two white elements (0–0). It will thus be seen that four different combinations of amplitude levels or states are provided, i.e., each group of two signal elements *a* and *b* may have any one of four different binary combinations of signal amplitude levels or states respectively identified in FIG. 2 as A (1–1), B (0–0), C (0–1) and D (1–0).

In accordance with the invention, a series of coded video signal pulses are generated, each having the same duration as the Groups I, II et seq., of signal elements *a* and *b*, these coded video signal pulses respectively having four different transmission characteristics respectively responsive to the four different combinations of sampled video signal levels or states in each group of sampled signal elements. Thus, in accordance with the invention, the coded video signal pulses may have four different amplitude levels, the fourth or highest amplitude level indicating the A characteristic (two successive "black" samples), the first or lowest amplitude level corresponding to the B characteristic (two successive "white" samples), and the second and third amplitude levels respectively corresponding to the C characteristic (a "white" sample followed by a "black" sample) and the D characteristic (a "black" sample followed by a "white" sample).

Referring now to FIG. 3, there is shown a system for producing four-level amplitude coded pulses employing binary circuit techniques. A conventional camera tube 36 is provided having a target electrode 37 coupled to an initial video signal output circuit 38, camera tube 36 converting an optical image formed of two contrasting colors, such as black and white, into a two level, time-based, binary initial video signal in output circuit 38, as is well known to those skilled in the art. A conventional video squarer circuit 39 is preferably provided coupled to the camera tube of output circuit 38 for converting the raw or initial video signal into a series of square video pulses of varying duration thereby to eliminate any gradual transitions between "black" and "white" levels in order to reduce the sampling error. Squaring of the initial video signal may not be necessary in certain systems having a relatively high initial signal bandwidth. The squared binary initial video signal pulses thus appear on output circuit 40 of the squaring circuit 39.

A clock pulse generator 42 is provided, which may be any conventional free-running square wave generator, clock pulse generator 42 providing a sampling frequency which is at least twice the highest anticipated frequency of the initial video signal. Output circuit 43 of clock pulse generator 42 is coupled to a conventional narrow pulse generator 44 which generates sampling pulses 62, as shown in FIG. 7, having a much shorter duration than the clock pulses 97 and having the same repetition frequency as the clock pulses. Thus, the period of the sampling pulses 62 provided by pulse generator 44 will be no longer than the duration of the minimum width video signal pulse.

A two-bit storage shift register 45 is provided having its signal input circuit coupled to output circuit 40 of video squarer circuit 39 and having its shift pulse input circuit coupled to output circuit 46 of sampling pulse generator 44. The first and second storage units 47, 48 of the shift register 45 respectively have "one" and "zero" state output circuits 49, 50, 52, 53. It will thus be seen that two successive squared initial video signal elements are shifted into storage units 47, 48 of shift register 45 by the sampling pulses 62 provided by the sampling pulse gnerator 44 and are thus temporarily stored therein. It will further be seen that a "one" level signal is provided in output circuit 49 if the signal stored in the first storage unit 47 has a "one" level and that a "one" signal will be provided in output circuit 50 if the signal stored in the first storage unit 47 has a "zero" level. Likewise, a "one" level signal will be provided in output circuit 52 if the signal stored in the second storage unit 48 has a "one" level and a "one" level signal will be provided in output circuit 53 if the signal stored in the second storage unit 48 has a "zero" level.

Figure 4:
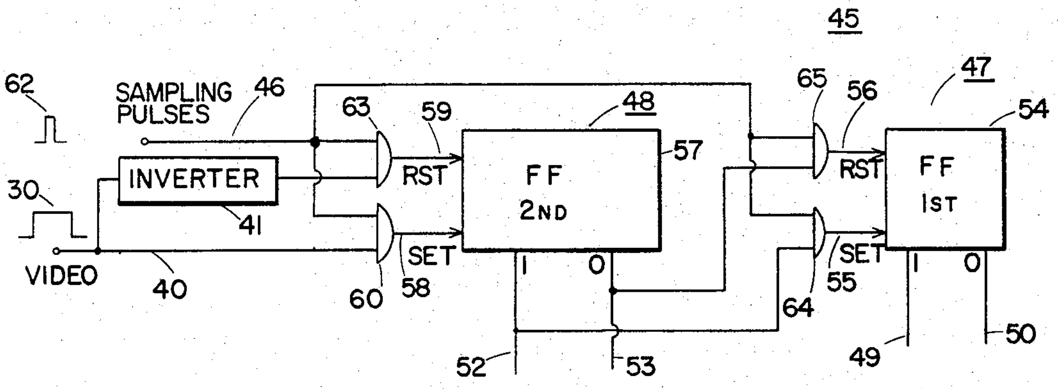
FIG. 4 is a schematic diagram showing one form of shift register which may be employed in the system of FIG. 3.

Referring briefly to FIG. 4 in which a typical circuit for the shift register 45 is shown, the first storage unit 47 comprises a conventional bistable multivibrator 54 having "set" and "rest" input circuits 55, 56 and "one" and "zero" output circuits 49, 50. The second storage unit 48 comprises a conventional bistable multivibrator 57 having "set" and "reset" input circuits 58, 59 and "one" and "zero" output circuits 52, 53. The output circuit 40 of the video squarer 39 and the output circuit 46 of the sampling pulse generator 44 are coupled to a conventional AND circuit 60 having its output circuit coupled to the "set" input circuit 58 of bistable multivibrator 57. Thus, it will be seen that if a "black" or "one" pulse 30 and a sampling pulse 62 appear simutlaneously in circuits 40, 46, a "one" pulse will be applied to input circuit 58 to "set" bistable multivibrator 57 thereby to provide a "one" signal in output circuit 52; a "one" level signal appears in output circuit 53 at all times other than when bistable multivibrator 57 is in its "set" condition. Circuit 40 is also coupled to inverter 41 which with circut 46 is coupled to a conventional AND circuit 63 which in turn is coupled to the "reset" circuit 59 of the bistable multivibrator 57. Thus, when a "black" or "one" signal 30 is absent and a sampling pulse 62 is present, a "one" pulse appears in reset circuit 59 of bistable multivibrator 57 to reset the same.

The "one" output circuit 52 of bistable multivibrator 57 and the sampling pulse input circuit 46 are both connected to another conventional AND circuit 64 which has its output circuit coupled to the "set" input circuit 55 of bistable multivibrator 54. Thus, simultaneous occurence of a "one" level signal in output circuit 52 of bistable multivibrator 57 and a sampling pulse 62 will provide a "one" level signal in the "set" input circuit 55 of bistable multivibrator 54 to set the same thereby providing a "one" level signal in the output signal 49. The "zero" output circuit 53 of bistable multivibrator 57 and circuit 46 are both connected to another conventional AND circuit 65 which has its output circuit coupled to the "reset" circuit 56 of the bistable multivibrator 54 thereby to reset the same when a "one" signal appears in output circuit 53 of bistable multivibrator 57 and a sampling pulse 62 occurs. It will be readily understood that the shift register circuit shown in FIG. 4 does not form a part of the invention per se, and that other conventional forms of shift register circuits may be employed.

A plurality of AND gates 66 (0–0), 67 (0–1), 68 (1–0), and 69 (1–1) are provided each having three input circuits. Each output circuit of the shift register 45 is coupled to two of the AND gates 66, 67, 68, 69 thereby forming a logic network which provides the sampling of the groups of two successive initial video signal elements. Thus, output circuit 50 is coupled to AND gates 66, 67, output circuit 49 is coupled to AND gates 68, 69, output circuit 53 is coupled to AND gates 66, 68 and output circuit 52 is coupled to AND gates 67, 69.

A conventional frequency divider 70 is provided coupled to output circuit 43 of clock pulse generator 42 for providing a train of pulses 99 having half the frequency of the clock pulses 97 provided by the clock pulse generator 42. A narrow pulse generator 72 is provided coupled to the output circuit 73 of the frequency divider 70 for generating gating pulses 100 having a repetition frequency half that of the sampling pulses 62 provided by the sampling pulse generator 44, these narrow gating pulses 100 thus having a frequency no higher than the highest anticipated video frequency. Output circuit 74 of gating pulse generator 72 is coupled to all four of the AND gates 66, 67, 68, 69, so that each gating pulse 100 provided by the gating pulse generator 72 is simultaneously applied to the four AND gates. Employing gating pulses 100 having a repetition frequency half the repetition frequency of the sampling or shift pulses 62 permits shifting two video signal elements completely into the shift register 45 before its outputs are gated.

It will be seen that only one of the AND gates 66, 67, 68, 69 is enabled in response to application of a gating pulse 100 depending upon which of the shift register output circuits has a "one" level signal therein, thus, AND gate 66 (0–0) is enabled to provide a "one" signal in its output circuit 51 when the two successive video signal elements temporarily stored in the storage units 47, 48 of shift register 45 are both "white" thus providing "one" signals in the "zero" output circuits 50, 53. Likewise, AND gate 67 (0–1) is enabled to provide a "one" signal in its output circuit 61 when the video signal element stored in unit 47 is "white" and the video signal element stored in unit 48 is "black" thus providing output signals in output circuits 50, 52. It will further be seen that a "black" level video signal element in unit 47 and a "white" video signal element in storage unit 48 will enable AND gate 68 (1–0) to provide an output signal in its output circuit 71 and that an output signal will be provided in output circuit 81 of AND gate 69 (1–1) when the video signal elements simultaneously stored in the storage units 47, 48 are both "black" (1–1).

Output circuits 61, 71, 81 of the AND gates 67, 68, 69 are respectively coupled to the "set" input circuits of bistable multivibrators 75, 76, 77. Bistable multivibrator 75 when "set" provides a second amplitude level output circuit signal in its output circuit 78, bistable multivibrator 76 when "set" provides a third amplitude level output signal in its output circuit 79, and bistable multivibrator 77 when "set" provides the fourth and highest level output signal in its output circuit 80. Output circuits 78, 79, 80 of the bistable multivibrators 75, 76, 77 are coupled to coded video signal output circuit 82. Three OR circuits 83, 84, 85 are provided respectively having their output circuits 86, 87, 88 coupled to the "reset" input circuits of the bistable multivibrators 75, 76, 77. Each of the OR circuits 83, 84, 85 is coupled to two of the output circuits 61, 71, 81 of the AND gates 67, 68, 69 and output circuit 51 of AND gate 66 (0–0) is coupled to all of the OR gates 83, 84, 85. Thus, OR gate 83 is coupled to output circuits 71, 81, OR gate 84 is coupled to output circuits 61, 81 and OR gate 85 is coupled to output circuits 61, 71.

It will now be seen that a "one" output signal in output circuit 51 of AND gate 66, which is provided as above-described in response to two adjacent "white" video signal elements stored in the shift register 45, will enable all of the OR gates 83, 84, 85 thereby to "reset" all of the bistable multivibrators 75, 76, 77 to their "zero" level state so that a "zero" amplitude level is provided in the output circuit 82, this first or lowest level, i.e., "zero" which corresponds to two adjacent "white" elements of the same group thus being indicated by the absence of a pulse in output circuit 82. Occurrence of a "one" level signal in output circuit 61 of AND gate 67 (01) responsive to successive "white" and "black" video signal elements in the shift register 45 will "set" bistable multivibrator 75 to provide a second amplitude level pulse in the output circuit 82. Occurrence of a "one" signal in output circuit 71 of AND gate 68 (1–0) responsive to successive "black" and "white" video signal elements in the shift register 45 will "reset" bistable multivibrator 75 to terminate the second amplitude pulse and will "set" bistable multivibrator 76 to provide a third amplitude level pulse in the output circuit 82. Likewise, occurrence of a "one" level signal in output circuit 81 of AND gate 69 responsive to two successive "black" video signal elements stored in the shift register 45 will "reset" bistable multivibrator 76 to terminate the third amplitude level pulse and will "set" bistable multivibrator 77 to provide the fourth and highest amplitude level pulse in the output circuit 82.

It will now be seen that the amplitude level of the output signal from each of the bistable multivibrators 75, 76, 77 is different corresponding respectively to a particular pair of sequential video signal elements, i.e., bistable multivibrator 75 provides a second amplitude level corresponding to two successive "white" and "black" elements, bistable multivibrator 76 provides a third amplitude level output signal in response to two successive "black" and "white" video signal elements, and bistable multivibrator 77 provides the fourth and highest amplitude level output signal in response to two successive "black" video signal elements. It will further be seen that the minimum duration of an output pulse provided by one of the bistable multivibrators 75, 76, 77 is twice that of the minimum video signal pulse, i.e., the pulses provided by the bistable multivibrators 75, 76, 77 respectively having the same duration as the period of the gating pulses provided by the gating pulse generator 72, which in turn have a period twice that of the sampling pulses provided by the sampling pulse generator 44.

It will thus be seen that for a given transmission facility bandwidth, the coded video transmission rate can be doubled. Alternatively, for a given transmission rate, the transmission facility bandwidth can be cut in half. It will likewise be seen that any desired combination of transmission rate increase and bandwidth reduction may also be provided.

Line and frame synchronizing signals are provided in conventional fashion by conventional sync. generators 89 coupled to the deflection circuitry of camera tube 36 and to a conventional mixing circuit 90 for superimposing line and frame synchronizing signals upon the coded video signal. The output circuit 92 of mixing circuit 90 may be coupled to a conventional amplitude modulator 93 so that the coded video signal and synchronizing signals are amplitude modulated upon a carrier provided by a suitable carrier generator 94. Output circuit 95 of the modulator 93 is adapted to be coupled to a conventional transmission facility shown by the dashed line 96, which may be a narrow band transmission facility such as an ordinary voice-band telephone line.

It will be readily seen that the encoding system above described, generally identified at 101 in FIG. 3, may be incorporated bodily in existing slow scan television systems for transmitting black and white information, such a typewritten or printed documents, such as the system described and illustrated in co-pending application Ser. No. 246,103 of Nelson E. Hoag, filed Dec. 20, 1962, now U.S. Patent 3,251,937, issued May 17, 1966 and assigned to the assignee of the present application. Thus, by incorporating the encoding system shown in FIG. 3 in the television transmission system of the aforesaid Hoag application, the scanning rates may be doubled while still permitting transmission of the video signal information over a commercial voiceband telephone line.

Referring now to FIGS. 7 and 7*a* there is shown in FIG. 7A the clock pulses 97 provided by the clock pulse generator 42 which are shown to have half the pulse width and thus twice the frequency of the minimum width initial video signal pulse shown at 98 in FIG. 7B. The sampling pulses 62 provided by the sampling pulse generator 44 are shown in FIG. 7C, it being observed that the sampling pulses 62 are generated in response to the leading edges, respectively, of the clock pulses 97. The half-frequency, double-pulse width pulses 99 provided by the frequency dividing circuit 70 are shown in FIG. 7D and the gating pulses 100 provided by the gating pulse generator 72 are shown in FIG. 7G, it being observed that the gating pulses 100 are provided in response to the leading edges of the pulses 99, respectively. The same squared initial video signal 29 shown in FIG. 1 is shown in FIG. 7E and it will now be observed that the sampling pulses 62–1, 62–2 correspond to the samples 1 and 2 of group I of video signal elements *a* and *b* of FIG. 1, and that sampling pulses 62–3 and 62–4, 62–5 and 62–6, et seq. respectively fall in Groups II, III et seq., of video signal elements.

Referring now to FIG. 7F in which the signals appearing in output circuits 49, 50, 52, 53 of the storage units 47, 48 of shift register 45 are shown, it will be seen that the first sampling pulse 62–1 occurs during the "black" (1) video signal pulse 30 thus "setting" shift register storage unit 48 to provide a "one" signal in output circuit 52 and a "zero" level in output circuit 53. The second sampling pulse 62–2 occurs prior to termination of the "black" video signal pulse 30 and thus shift register storage unit 48 remains in its "set" condition so that the "one" signal level remains on output circuit 52 and the "zero" level remains on output circuit 53. The second sampling pulse 62–2 thus occurs during a "one" signal level output on output circuit 52 thus "setting" shift register storage unit 47 so that a "one" signal level appears on output circuit 49 and a "zero" level appears in output circuit 50. The third sampling pulse 62–3 occurs during the "white" level video signal 31 thus resetting storage unit 48 of shift register 45 so that a "zero" level appears in output circuit 52 and a "one" level appears in output circuit 53. The third sampling pulse 62–3 also occurs while a "one" signal level still appears in the output circuit 52 so that storage unit 47 remains in the "set" condition so that a "one" signal level remains in output circuit 49 and the "zero" level remains in output circuit 50. In this manner, as is well known to those skilled in the art, the sampling pulses 62 successively shift the initial video signal elements respectively comprising Groups I, II, et seq., through the shift register 45 with the output circuits 49, 50, 52, 53 thereof providing output signals respectively indicating the level or state of the shift register storage units 47, 48 upon the occurrence of each sampling pulse 62.

Referring now to FIGS. 7G and H, it will be seen that the gating pulse 100–1 occurs while a "one" level signal appears in output circuits 52 and 49 of the shift register 45, these "one" signals being applied to the AND gate 69 (1–1) so that the gating pulse 100–1 enables AND gate 69 to provide pulse 102–1 in its output circuit 81. Output pulse 102–1 in turn "sets" bistable multivibrator 77 to initiate the fourth amplitude level coded output pulse 103–1 in its output circuit 80 and in output circuit 82. It will thus be seen that pulse 102–1 and the resulting fourth level coded signal pulse 103–1 are provided in response to the simultaneous presence of two successive "black" signal elements in the shift register 45.

The second gating pulse 100–2 occurs when a "one" signal level appears in output circuit 53 of storage unit 48 of shift register 45 and a "one" level appears in output circuit 50 of storage unit 47, thus indicating the simultaneous presence of two successive "white" signal elements in the shift register. These "one" signals in output circuits 53, 50 are respectively applied to AND gate 66 (0–0) and thus the gating pulse 100–2 enables AND gate 66 to provide output pulse 102–2 in its output circuit 51 which is applied to OR circuit 85 to "reset" bistable multivibrator 77 thereby to terminate the fourth amplitude level coded video signal pulse 103–1. It will now be seen that the coded video signal pulse 103–1 has a duration or width equal to the period of the gating pulses 100, twice the period of a sampling pulse 62 and twice the duration or width of the minimum video pulse width 98. It will further be seen that upon the occurrence of the pulse 102–2 in the output circuit 70 of AND gate 66 (0–0) none of the multivibrators 75, 76, 77 will be "set" thereby providing the zero or first level coded video signal 103–2 in output circuit 82.

The third gating pulse 100–3 occurs when a "one" signal appears in output circuit 52 of storage unit 48 of shift register 45 and a "one" level signal appears in output circuit 50 of storage unit 47, thus indicating that successive "white" and "black" level elements are stored in the shift register 45, these "one" signals being applied to AND gate 67 (01). The third gating pulse 100–3 thus enables AND gate 67 to provide pulse 102–3 in its output circuit 61 which "sets" bistable multivibrator 75 to initiate a second amplitude level coded video signal pulse 103–3. It will be observed that while the pulse 102–3 in the output circuit 61 of AND gate 67 is also applied to OR gates 87, 88, bistable multivibrator 76, 77 are both "reset" at that time so that application of the respective pulses to the "reset" circutis of those multivibrators is of no effect. The second amplitude level coded video signal 103–3 thus appears in output circuit 82.

The fourth gating pulse 100–4 likewise occurs when a "one" signal appears in the output circuit 52 and a "one" signal appears on output 50 thereby again indicating the storage of successive "white" and "black" video signal elements in shift register 45. Another pulse 102–4 is thereby provided in output circuit 61 of AND gate 67. However, since bistable multivibrator 75 is already in its "set" condition, and bistable multivibrators 76, 77 are in their "reset" conditions, pulse 102–4 provided by AND gate 67 has no effect and thus bistable multivibrator 75 remains in its "set" condition in essence to provide another second amplitude level pulse 103–4 in its output circuit and in output circuit 82.

The fifth gating pulse 100–5 occurs when a "one" signal appears on output circuit 53 of storage unit 48 of the shift register 45 and a "one" level signal appears in output circuit 49 of storage unit 47, thus indicating storage of successive "black" and "white" video signal elements in the shift register. These "one" signal levels are applied to AND gate 68 (1–0), so that application of the gating pulse 100–5 enables AND gate 68 to provide pulse 102–5 in its output circuit 71. Pulse 102–5 thus "sets" bistable multivibrator 76 to initiate the third amplitude level coded video signal pulse 103–5 in its output circuit and in output circuit 82, pulse 102–5 resetting bistable multivibrator 75 with bistable multivibrator 77 remaining in its "reset" condition.

The sixth gating pulse 100–6 occurs when a "one" level signal appears in output circuit 53 of storage unit 48 of the shift register 45 and a "one" level signal appears in output circuit 50 of storage unit 47 thus indicating the presence of two successive "white" video signal elements in the shift register. These "one" signals are applied to AND gate 66 which is enabled by the gating pulse 100–6 to provide output pulse 102–6 in output circuit 51 of AND gate 66. Output pulse 102–6 resets bistable multivibrator 76 to pulse 103–5 and since the output pulse 102–6 is not employed to "set" any of the bistable multivibrators, the first or "zero" amplitude level is provided in the output circuit 82 as shown at 103–6 in curve J FIG. 7*a*.

Referring now to FIG. 5, the transmission facility 96 is coupled to a conventional demodulator 104 which has its output circuit 105 coupled to a conventional sync. separating circuit 106 for applying the detetced coded video and synchronizing signal thereto. Output circuit 107 of the sync. separator 106 applies the separated line and frame synchronizing signals to the deflection circuitry of display tube 108, as is well known to those skilled in the art.

Output circuit 109 of sync. separator 106 applies the four level coded video signal to a threshold detecting circuit 110 which detects the threshold levels of the second, third, and fourth, amplitude level coded video signal pulses and respectively provides output signals in response thereto and its output circuits 112, 113 and 114, i.e., a fourth level coded video signal provides a signal in output circiut 114, a third level coded video signal provides an output signal in output circuit 113 and a second level coded video signal provides an output signal in output circuit 112.

Figure 6:
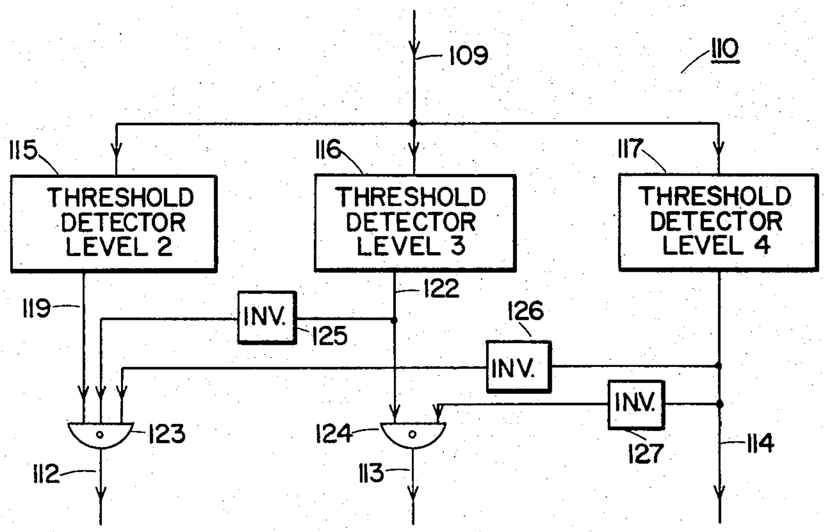
FIG. 6 is a schematic diagram showing one form of threshold detector which may be employed in the embodiment of FIG. 5.

Referring additionally to FIG. 6 and FIGS. 8A and B, threshold detector 110 comprises three conventional threshold detectors 115, 116 and 117. Threshold detector 115 detects any signal having an amplitude higher than that shown by the dashed line 118 in FIG. 8A and provides an output signal in response thereto in its output circuit 119. Threshold detector 115 will thus provide an output signal in response to coded video signal pulses having the second, third and fourth levels. Threshold detector 116 detects signals having an amplitude level higher than the level shown by the dashed line 120 in FIG. 8A and provides an output signal in response thereto in its output circuit 122. Threshold detector 116 thus will provide an output signal in response to coded video signal pulses having the third and fourth levels. Threshold detector 117 detects signals having an amplitude level higher than the level shown by the dished line 121 and provides an output signal in response thereto in its output circuit 114. Threshold detector 117 thus provides an output signal only in response to coded video signal pulses having the fourth level. In order to provide an output signal in output circuit 112 only in response to a coded video signal pulse having the second level and an output signal in output circuit 113 only in response to a coded video signal pulse having the third level AND gates 123, 124 are respectively coupled to output circuits 119, 122 of threshold detectors 115, 116. Output circuits 122, 114 are coupled to AND gate 123 by conventional inverting circuits 125, 126 and output circuit 114 is coupled to AND gate 124 by inverting circuit 127. Thus, if a coded video signal having the second level is provided, an output signal appearing in line 119 will be applied to AND gate 123. There will, however, be no output signals in output circuits 122, 114, due to the absence of third and fourth level coded video signal pulses and thus inverting circuits 125, 126 will apply signals to AND gate 123 thereby providing an output signal in output circuit 112 as shown at 128 in FIG. 8D. It will be seen, however, that in the case of a third or fourth level coded video signal pulse, while an output signal will be provided in output circuit 119, output signals will also be provided in output circuit 122 and/or output circuit 114, those signals being inverted by inverting circuits 125, 126 thus disabling AND gate 123 so that no output signal is provided in output circuit 112. The function of AND gate 124 and inverter 127 is identical in serving to provide an output signal in output circuit 113 only in response to a third level coded video pulse, as shown at 129 in FIG. 8D. Threshold detector 117 provides an output signal 130 in its output circuit 114 in response to a fourth level coded video signal pulse, as shown in FIG. 8D.

Referring again to FIG. 5, output circuits 112, 113 and 114 of threshold detector 110 are respectively coupled to AND gates 132, 133 and 134. Output circuits 112, 113 and 114 are also coupled by conventional inverting circuits 135, 136 and 137 to AND gate 138 which is used for resetting the subsequent multivibrator, as will be hereinafter described.

A conventional clock pulse generator 139 is provided generating clock pulses having a frequency half the frequency of the clock pulses 97 generated by the clock pulse generator 42 of the encoding unit 101 (FIG. 3). A differentiating circuit 140 couples output circuit 109 of the sync. separator 106 to clock pulse generator 139 for differentiating the coded video signal pulses and applying the same to the clock pulse generator 139 thereby to lock clock pulse generator 139 to the clock pulse generator 42 of the encoding unit 101. Clock pulse generator 139 is provided with two output circuits 141, 142 respectively providing "zero" and "one" signals in response to the clock pulses 143, as shown in FIG. 8B.

A narrow pulse generator 144 is coupled to the "zero" output circuit 141 of the clock pulse generator 139 and generates sampling pulses 145 respectively in response to the trailing edges of the clock pulses 143. It will be observed that the sampling pulses 145 thus are generated in the middle of the respective coded video signal pulses 103. Output circuit 146 of sampling pulse generator 144 is coupled to all of the AND gates 132, 133, 134 and 138 for enabling the same in response to the sampling pulses 145.

AND gates 132, 133 and 134 respectively have their output circuits 147, 148, 149 coupled to the "set" input circuits of bistable multivibrators 150, 151 and 152. Three OR gates 153, 154, and 155 are provided respectively coupled to the "reset" input circuits of the bistable multivibrators 150, 151, 152. Output circuit 156 of AND gate 138 is coupled to each of the OR gates 153, 154 and 155, each of the OR gates being coupled to two of the output circuits 147, 148, 149 of the AND gates 132, 133, 134, i.e., OR gate 153 is coupled to output circuits 148, 149, OR gate 154 is coupled to output circuits 147, 149, and OR gate 155 is coupled to output circuits 147, 148. Outputs circuits 157, 158, 159 of the bistable multivibrators 150, 151, 152 are respectively coupled to output AND gates 160, 162, 163 which serve to reconstruct the initial video signal. AND gate 160 (0-1) is coupled to output circuit 142 of the clock pulse generator 139 and is thus enabled by the "one" output signal therefrom. AND gate 162 (1-0) is coupled to output circuit 141 of the clock pulse generator 139 and is thus enabled by the "zero" output signal therefrom. AND gate 163 is coupled to a source 164 of fixed potential. Thus, as will be hereinafter more fully described, the "black"-"white" sequence is generated by using the "zero" output from the clock pulse generator 139 while the "white"-"black" sequence is generated by using the "one" output pulse from the clock generator. The fixed voltage 164 is used to generate a sequence of two "black" elements while the sequence of two "white" elements is generated by the absence of pulses. The output circuits of the output AND gates 160, 162, 163 are coupled to circuits 165 in which the reconstructed binary pulsed video signal appears, line 165 being coupled to the beam intensity control circuitry of display tube 108 thereby to pulse the electron beam therein "on" and "off" so as to convert the reconstructed video signals into a displayed optical image corresponding to the original optical image viewed by the camera tube 36.

Referring now again to FIG. 8, the detected coded video signal 115 which appears on output circuit 109 of the sync. separator 106 is shown in FIG. 8A, the clock pulses 143 generated by the clock pulse generator 139 are shown in FIG. 8B, the sampling pulses 145 generated by the sampling pulse generator 144 are shown in FIG. 8C and the threshold signals 128, 129, 130 respectively appearing in output circuits 112, 113 and 114 of threshold detector 110 respectively responsive to the second, third and fourth amplitude level coded viodeo signal pulses 103–4, 103–5 and 103–1 are showin in FIG. 8D.

It will be seen that the signal 130 in the output circuit 114 of threshold detector 110 responsive to the fourth level coded video signal 103–1 is applied to AND gate 134 and that when the first sampling pulse 145–1 is applied to that AND gate, an output pulse 166–1, is provided in output circuit 149 as shown in FIG. 8E. Output pulse 166–1 "sets" bistable multivibrator 152 to initiate pulse 167–1, as shown in FIG. 8F. Output AND gate 163 is continuously enabled by voltage 164 and thus application of pulse 167–1 from the bistable multivibrator 152 to AND gate 163 provides video pulse 168–1 in output circuit 165.

It will here be observed that in the process of transmission, the coded video signals may become distorted, thus, in order to reduce any sampling error which may arise because of any such distortion, the sampling pulses 145 sample the amplitudes of the coded video signal pulses 103 at the middle of the respective pulse periods.

The second sampling pulse 145–2 occurs in the middle of the "white"-"white" coded video signal pulse 103–2. Since at this sampling interval there will be no output signals in any one of the output circuits 112, 113, 114 of threshold detector 110, the inverting circuits 135, 136, and 137 will apply signals to the AND gate 138. Thus, application of the second sampling pulse 142–2 to AND gate 138 will provide pulse 166–2 in its output circuit 156 which is applied to all of the the OR gates 153, 154, 155 thus resulting in application of a resetting signal to the "reset" circuit of bistable multivibrator 152 thereby to terminate pulses 167–1 and 168–1 as shown in FIGS. 8F and G.

A third sampling pulse 145–3 is generated during the occurrence of output signal 128 in the output circuit 112 of threshold detector 110 in response to the second level coded video pulses 103–3, 103–4. Threshold signal 128 is applied to AND gate 132 and thus, when the sampling pulse 145–3 is applied to AND gate 132, pulse 166–3 is provided in its output circuit 147 which "sets" bistable mulitvibrator 150 to initiate output pulse 167–2 as shown in FIG. 8F. Output signal 167–2 is applied to output AND gate 160 by output circuit 157 and thus, when the "one" signal 143–1 from clock pulse generator 139 is applied by output circuit 142 to AND gate 160, output video signal pulse 168–2 is initiated as shown in FIG. 8G; termination of the "one" clock pulse 143–1 will terminate output video signal pulse 168–2, as shown.

The next sampling pulse 145–4 is generated while the threshold signal 128 is still present in the output circuit 112 of threshold detector 110 and thus another pulse 166–4 is provided in output circuit 147 of AND gate 132. However, bistable multivibrator 150 is already in the "set" state and thus the pulse 166–4 has no effect. It will be observed, however, that output pulse 167–2 provided in the output circuit 157 of bistable multivibrator 150 continues, and thus upon the occurrence of the next "one" clock pulse 143–2 and its application by output circuit 142 to AND gate 160, AND gate 160 is again enabled to initiate output video signal pulse 168–3.

The next sampling pulse 145–5 is generated during the occurrence of threshold signal 129 in output circuit 113 of threshold detector 110 in response to the third level coded video signal pulse 103–5. Threshold signal 129 is applied to AND gate 133 and thus when the sampling pulse 145–5 is applied thereto, pulse 166–5 is provided in output circuit 148 of AND gate 133. Pulse 166–5 is applied to OR gate 153 thereby to "reset" bistable multivibrator 150 to terminate output pulse 167–2, and is also applied to the "set" circuit of bistable multivibrator 151 to initiate output pulse 167–3. Termination of the "one" clock pulse 143–2 and thus its removal from output AND gate 160 would ordinarily have terminated output video signal pulse 168–3, however, output pulse 167–3 from bistable multivibrator 151 is simultaneously applied to AND gate 162 along with the "zero" pulse 143–3 from clock pulse generator 139 applied by output circuit 141 to AND gate 162 thereby enabling the same to continue output video signal pulse 168–3 as shown in FIG. 8G. Termination of "zero" clock pulse 143–2 and its accompanying removal from output AND gae 162 terminates output video signal pulse 163–3.

Sampling pulse 145–6 is generated during the first level or "white"-"white" coded video signal pulse 103–6 and thus provides pulse 166–6 in the output circuit 156 of AND gate 138 which is applied to OR gate 154 thereby to reset bistable multivibrator 151 to terminate output pulse 167–3, as shown in FIG. 8F.

Referring now to FIG. 8G in which the displayed video output signal which is applied to the display tube 108 is shown and FIG. 8H in which the initial squared video signal 29 is shown, it will be seen that the reconstructed displayed video signal 168 closely corresponds to the initial squared video signal 29, there being the same number of "black" and "white" binary signal elements having relatively the same durations. Thus, while the width of individual elements of the displayed image may be slightly greater or smaller than the width of corresponding elements of the optical image scanned by the camera tube 36, it is important to observe that the resolution of the displayed image is unaffected by the encoding and decoding process.

It will be observed that the decoding apparatus 169 shown in FIG. 5 may be inserted bodily in the receiving station of a television transmission and receiving system, such as that described and illustrated in the aforementioned application Ser. No. 246,103.

Referring now to FIG. 9 in which like elements are indicated by like reference numerals, another encoding system, generally indicated by the reference numeral 170 is shown which produces a coded video output signal equivalent to that provided by the binary method of the encoding system 101 of FIG. 3, the system of FIG. 9, however, employing an analog method of encoding. Referring additionally to FIG. 11, a conventional clock pulse generator 172 generates clock pulses 173 having a frequency no higher than the highest anticipated frequency of the initial video signal, shown here as being equal to the highest anticipated initial video signal frequency. Output circuit 174 of clock pulse generator 172 is coupled to sampling pulse generator 175 which generates narrow sampling pulses 176.

The output circuit 40 of the video squaring circuit 39 is coupled to a conventional delay line 177 and to a conventional attenuating circuit 178. In the illustrated embodiment which, in common with the embodiment of FIG. 3, provides a 2:1 reduction with four coding levels, delay line 177 delays the squared video signal 29 by one-half the period of the clock pulses 173, as shown at 29D in FIG. 11E, and attenuating circuit 178 attenuates the squared video signal 29 by a factor of two thereby to provide a signal corresponding to the squared video signal 29 but having one-half the amplitude, as shown at 29A in FIG. 11D. It will be understood as the description proceeds that the objective is to provide a fixed phase displacement between the signals provided in the parallel output circuits 179, 180 with the two signals in these two circuits being phase displaced by a fraction of the period of the clock pulses 173 with the number of such parallel circuits (in this case two, 179, 180) being the denominator of that fraction, and further that there be a fixed amplitude ratio between the signals in the two circuits 179, 180. It will thus be seen that an amplifying stage may be substituted for the attenuating circuit 178.

Output circuit 179 of delay line 177 and output circuit 180 of attenuating circuit 178 are coupled to a conventional amplitude adding circuit 182 which adds the amplitudes of the phase and amplitude displaced signals 29A, 29D to provide a resulting four level signal 29F, as shown in FIG. 11F. The output circuit 183 of the amplitude adder 182 is coupled to a conventional switching or gating circuit 184. Output circuit 185 of sampling pulse generator 175 is also coupled to switch 184 so that the sampling pulses 176 gate the amplitude level of signal 29F in output circuit 183 to output circuit 186 of switch 184, as shown at 187 in FIG. 11G. Output circuit 185 of sampling pulse generator 175 is also coupled to conventional differentiating and clipping circuit 188 which differentiates and clips the negative pulses of the sampling pulses 176 as shown at 189 in FIG. 11H.

The output pulses 187 in the output circuit 186 of switch 184 are applied to amplitude storage circuit 190 with the output circuit 192 of differentiating and clipping circuit 188 also being coupled thereto so that the amplitudes of the pulses 187 are stored for one period, i.e., the period of the sampling pulses 176. The coded video signal pulses 115 which are provided in the output circuit 193 of the amplitude storage circuit 190 are mixed with the sync. signals in mixer 90, as above described.

Referring briefly to FIG. 10, amplitude storage circuit 190 may comprise a suitable capacitor 194 coupled between output circuit 186 of switch 184 and ground. Another suitable switching circuit or gate 195 is coupled between output circuit 186 and ground with output circuit 192 from differentiating and clipping circuit 188 being coupled thereto so that the switch 195 is actuated in response to the differentiated signals 189 thereby directly to couple output circuit 186 and the side of capacitor 194 removed from ground to ground. Output circuit 186 is also coupled to the base of transistor 196 having output circuit 193 coupled thereto in a conventional emitter-follower configuration. It will be seen that the differentiated pulses 189 occur in coincidence with the leading edges of the four level pulses 187, however, that the differentiated pulses 189 have a much shorter duration than the pulses 187. Thus, a differentiated pulse 189 actuates switch 195 at the beginning of a pulse 187 rapidly to discharge capacitor 194. Following termination of the differentiated pulse 189, the respective pulse 187 charges capacitor 194 which has a normal discharge time substantially longer than the period of the sampling pulses 176. Thus, the charge potential on capacitor 194 will be applied to the base of transistor 196 thereby to provide a resulting output signal in output circuit 193, capacitor 194 being discharged again by the next differentiated pulse 189, thereby providing a coded video output pulse having the same amplitude as pulse 187, but having the same duration as the period of the sampling pulses 176.

Referring now specifically to FIG. 11, it will be seen that the attenuated pulse 30A and delayed pulse 30D by virtue of their amplitude ratio and phase displacement provide when added a four level pulse 30F. The first sampling pulse 176–1 occurs during the interval when the pulse 30F is at its fourth level thus providing the fourth level sampled pulse 187–1 which, when stored by the amplitude storage circuit 190, provides the fourth level coded video signal pulse 103–1.

The second sampling pulse 176–2 occurs during an interval when both the attenuated signal 29A and the delayed signal 29D are at "zero" level so that no sampled pulse 187 is provided thus resulting in the provision of the first or "zero" level coded video signal pulse 103–2.

The third sampling pulse 176–3 occurs at an interval when the added pulse 32F has the second level, thus providing a second level sampled pulse 187–3 and the second level coded video signal pulse 103–3. The fourth sampling pulse 176–4 likewise occurs when the added pulse 34F has the second level thus providing the second level sampled pulse 187–4 and the second level coded video signal output pulse 103–4. The fifth sampling pulse 176–5 occurs when the sampled pulse 34F is at the third level thus providing a third level sampled pulse 187–5 and the third level coded video signal 103–5. Finally, the sixth sampling pulse 176–6 occurs when both the attenuated signal 29A in the delayed signal 29D have "zero" levels and thus no sampled pulse is provided thereby providing the first level coded video signal output pulse 103–6.

Referring additionally to FIG. 12, it will be observed that by dividing the initial squared video signal into two channels and by delaying the signal in one of the channels with respect to the other by the basic sampling interval, i.e., no longer than the width of the minimum anticipated initial video signal, each sampling pulse 176 in essence provides the first and second samples of the two video signal elements forming each of the groups I, II, etc.; the sample of the delayed signal is thus the first sample of a respective group and the sample of the attenuated signal is the second sample. It will thus be seen that by assigning values of "two" and "zero" to the black and white levels, respectively, of the squared video signal, and by adding one-half of the value of the second sample (the one-half being provided by the attenuation of the squared video signal) to the first sample, four different analog values are provided to which the four coded video signal pulse amplitude levels may be respectively assigned, as shown.

Since the coded video signal 115 provided by the analog system of FIG. 9 is identical to that provided by the binary system of FIG. 3, the decoding system of FIG. 5 may be used with either encoding system.

Referring now to FIGS. 13 and 14 in which the same initial squared video signal 29 is shown, it will be seen that if the video signal is divided into successive groups of three elements, each element again having a duration no longer than the duration of the minimum anticipated video pulse, and with the amplitude of each of these signal elements being sampled once, eight transmission code characteristics are provided and the transmission time or bandwidth reduced by a factor of three. Thus, it is seen that the first, second and third elements sampled in Group I are all "black" thus providing transmission characteristic A, the first, second and third samples in Group II are all "white" thus providing transmission characteristic B while the three samples of Group III are "white" followed by two "black" level signals to provide transmission characteristic C. The chart of FIG. 14 illustrates the remaining combinations of the three signal element samples of each group of three elements to provide a total of eight transmission characteristics A through H.

Referring now to FIG. 15 in which like elements are indicated by like reference numerals, there is shown a modification of the analog of the system of FIG. 9 to provide sampling of three signal elements per group as described above. Here, three parallel circuits 197, 198, 199 are respectively coupled to output circuit 40 of video squaring circuit 37. A conventional attenuating circuit 200 is coupled to circuit 199 and provides attenuation of the squared video signal by a factor of four, i.e., reducing the amplitude of the squared video signal 29 to one-quarter the original amplitude, as shown at 29A–4 in FIG. 16D. A conventional attenuating circuit 202 is coupled to circuit 198 and attenuates the initial squared video signal 29 by a factor of two, i.e., reducing the amplitude of the initial squared video signal by one-half as shown at 29AD in FIG. 16E. The resulting attenuated signal in output circuit 203 of attenuator 202 is delayed by conventional delay line 204 by one-third the period of the sampling pulses 176 as shown in FIG. 16E. The initial squared video signal in circuit 197 is delayed by conventional delay line 205 by two-thirds the period of the sampling pulses 176. Attenuator 200, delay line 204 and delay line 205 respectively have their output circuits 206, 207, 208 coupled to the amplitude adding circuit 182. It will again be observed that the fixed amplitude ratio between the signals in the three parallel circuits 197, 198, 199 may be provided by amplifiers rather than by attenuators. It will further be observed that the delay lines 204, 205 provide a fixed phase displacement between the video signals in the three parallel circuits 197, 198, 199, the signals being respectively phase displaced by a fraction of the sampling period with the denominator of the fraction being the number of parallel circuits, in this case three.

Inspection of FIG. 16 will now reveal that the three signals 29A, 29AD and 29D having a fixed amplitude relationship and a fixed phase relationship, as above described, when added by the amplitude adding circuit 182, provide a resulting signal having eight levels, as shown at 209 in FIG. 16G. The samling pulses 176 provided by the sampling pulse generator 175 (FIG. 9) again sample the eight-level signal 209 at the sampling frequency thereby to provide sampled pulses 210 respectively having the same amplitude levels as that of the eight-level signal 209 at the respective sampling intervals. The eight-level sampled pulses 210 provided by the switch 184 are again applied to the amplitude storage circuit 190 along with the differentiated signals 189 thereby to provide an eight-level coded video signal 115, as shown in FIG. 16J. It will be readily understood that the decoding system for use with the eight-level encoding system of FIG. 15 will require provision of a threshold detector arranged to detect seven discrete levels (the remaining level being the zero level) and the addition of four AND gates, bistable multivibrators, and output AND gates.

The frequency spectrum of the multi-amplitude coded video signals provided by the encoding systems described above extends downwardly to and including direct current. In many transmission facilities, it is difficult if not impossible to transmit direct current and in such cases, it is not possible to distinguish between permanent white and permanent black signals. For this reason, baseband transmission is not desirable, particularly when such a multi-amplitude signal is transmitted over a single sideband telephone facility since the recovered signal may vary in frequency from that transmitted. Accordingly, the multi-amplitude coded video signal provided by the encoding systems of FIGS. 3, 9 and 15 may be amplitude modulated onto a carrier, as shown. In the case of ordinary message telephone facilities, the multi-amplitude coded video signal is desirably amplitude modulated and transmitted in vestigial sideband fashion as described in the aforesaid application Ser. No. 246,103.

While the coding of the video signal pulses may be in amplitude levels, as above described, it will be readily apparent that other transmission characteristics, such as frequency, may be employed for the coding. Thus, instead of assigning a different amplitude level to each combination of successive video elements, a separate frequency may be assigned arbitrarily in a frequency shift system. For a given carrier level, frequency shift as opposed to amplitude modulation provides a somewhat more error-free means of transmission and furthermore, frequency shifting is less vulnerable to sudden level changes.

Referring to FIG. 17, frequency shift transmission may be accomplished by substituting a conventional voltage controlled oscillator 212 for the amplitude modulator and carrier generator 93, 94 of FIGS. 3 and 9 so that the amplitude coded video signals 115 control the frequency provided by oscillator 212 to provide a transmission signal having different frequencies respectively corresponding to the amplitude levels of the coded video signal. Referring to FIG. 19, the decoding system of FIG. 5 may be modified to accommodate such frequency shifted signals by substituting a conventional discriminator 213 for the demodulator 104. Discriminator 213 provides an output signal level which is proportional to the amount by which the input signal deviates from a given center frequency.

Referring now to FIG. 18 in which like elements are indicated by like reference numerals, a modification of the encoding system of FIG. 3 is shown incorporating a separate oscillator associated with each combination of video signal elements and also with the synchronizing signals. In this embodiment, a separate bistable multivibrator 214 is provided for generating the "zero" or "white"-"white" pulse, bistable multivibrator 214 having its "set" circuit coupled to output circuit 51 of AND gate 66 (0–0) with OR gate 215 coupled to its "reset" circuit and respectively coupled to output circuits 61, 71 and 81 of AND gates 67 (0–1), 68 (1–0) and 69 (1–1). Here, output circuit 216 of bistable multivibrator 214 and output circuits 78, 79, 80 of bistable multivibrators 75, 76, 77 are respectively connected to output AND gates 217, 218, 219 and 220 with oscillators 222, 223, 224 and 225 likewise being respectively coupled to AND gates 217–220 and respectively providing different frequencies. Each of the AND gates 217–220 has its output circuit coupled to coded video signal output circuit 226. It will thus be seen that when a "zero" coded video signal pulse is provided by bistable multivibrator 214 and applied by output circuit 216 to AND gate 217, AND gate 217 is enabled thereby applying the frequency of oscillator 222 to output circuit 226. It will readily be seen that the remaining output AND gates 218, 219 and 220 are enabled in the same manner to provide the desired frequency shifted signal in output circuit 226 and transmission facility 96. In this embodiment, the sync. signals in output circuit 91 of sync. generators 89 are coupled to AND gate 227 to which oscillator 221 is coupled, oscillator 221 providing a still different frequency indicative of the provision of the sync. signals. AND gate 227 also has its output circuit coupled to the coded video signal output circuit 226. It will be readily seen that the frequency shift system provided in FIG. 18 permits the different coding frequencies to be more accurately controlled and switched. While a "zero" bistable multivibrator 214, AND gate 217, and oscillator 222 are shown, it will be readily understood that only four oscillators are required since the absence of a signal can be used to indicate one sequence of the video signal elements or the synchronizing pulse.

Referring now to FIG. 20, another modification of the decoding system of FIG. 5 is shown for converting the frequency shifted signal provided by the system of FIG. 18. Here, a plurality of bandpass filters 228, 229, 230, 232, 233 are provided respectively tuned to pass the frequencies provided by the oscillators 222, 223, 224, 225 and 221 of FIG. 18. Each of the filters 228–233 is coupled to a detector 234–238 which respectively rectify the filtered AC signals passed by the filters 228–233. The output circuits of the detectors 234–237 are respectively connected to the AND gates 138, 132, 133, 134 and to conventional differentiating circuits 239–242 which are coupled to clock pulse generator 139 so as to lock the same to the clock pulse generator of the encoding system. It will thus be seen that the DC signals provided by the detectors 234–237 respectively activate the AND gates 138, 132, 133, 134 and that the remainder of the system functions in the same manner as the system of FIG. 5 described above. It will be observed, however, that since one detector output goes positive while another goes negative, they would cancel each other if they were applied simultaneously to the clock pulse generator 139 and therefore, it is necessary to employ the differentiating circuits 239–242 in order separately to differentiate the output of each detector. Since positive and negative differentiated spikes are provided, diodes 243 are provided in the output circuit of each of the differentiators 239–242 in order to allow only the positive differentiated signals to pass.

While coding of the combinations of the "black" and "white" states of the elements of successive groups of the initial video signal by means of different amplitude levels and by frequency shifting has been described, it will be readily comprehended that the coding may be provided by phase shifting, i.e., phase modulation of the carrier signal, as is well known to those skilled in the art.

It will now be seen that in accordance with the invention, transmission time and/or bandwidth reduction of a pulsed signal is accomplished by means of multi-amplitude, multi-frequency, or multi-phase coding of successive groups of signal elements. It will be seen that the encoding and decoding systems of the invention are separate units which may be incorporated in existing data transmission or television systems without further modification of the system. It will further be observed that in that contrast with certain prior bandwidth compression systems in which variable scanning rates are employed, the scanning or signal generation rate may be constant with the system of the invention so that any errors which might be introduced are not cumulative. It will be seen, however, that the encoding and decoding systems of the invention may be used in conjunction with other bandwidth compression techniques by considering the coded pulses provided by such techniques as the initial video signal. It will finally be seen that it is possible to code a ternary or other multiple initial signal by the time-bandwidth reduction techniques of the invention, with, however, a larger number of transmission coding characteristics for the same reduction.

While there have been described above the principles of this invention in connection with specific apparatus, it is to be clearly understood that this description is made only by way of example and not as a limitation to the scope of the invention.

What is claimed is:

1. In an information transmission system including means for generating an initial time-based pulsed electrical signal conveying the information to be transmitted, means for converting a time-based electrical signal into output information, and means for transmitting a time-based electrical signal from said generating means to said converting means: transmission time-bandwidth reduction means comprising means for generating a train of sampling pulses having a first repetition frequency which is a multiple at least twice the highest frequency of said initial signal pulses, shift register means having a plurality of storage units, said shift register means being coupled to said generating means and to said sampling pulse generating means whereby said initial signal pulses are shifted into said shift register means by said sampling pulses, said storage units having output circuit means for respectively providing binary signals responsive to the binary level of the pulses stored therein, means for generating a train of gating pulses having a second repetition frequency which is equal to said first repetition frequency divided by the number of said storage units, a plurality of gating circuit means equal to the number of combinations of said binary signals and respectively having output circuits, means coupling said output circuit means of said storage units to said gating circuit means for applying each different combination of said binary signals to a different one of said gating circuit means, said gating pulse generating means being coupled to said gating circuit means for applying said gating pulses thereto whereby an output signal is provided in the output circuit of the respective gating circuit means which has said binary signals applied thereto, means coupling said output circuits of said gating circuit means to said transmitting means for generating coded signal pulses having a duration equal to the period of said gating pulses and having different predetermined characteristics respectively responsive to said output signals; and means coupling said transmitting means to said converting means and including means for decoding said coded signal pulses thereby to provide a time-based signal for said converting means corresponding to said initial signal.

2. The system of claim 1 wherein said coded signal characteristics are amplitude levels.

3. The system of claim 1 wherein said coded signal characteristics are frequencies.

4. The system of claim 1 wherein said coded signal characteristics are amplitude levels, and wherein said decoding means comprises threshold detecting means for detecting said amplitude levels of said coded signal pulses and for providing separate signals in separate channels respectively responsive thereto, and means for generating output signal pulses respectively responsive to said separate signals and corresponding to said initial signal during the respective group of segments thereof.

5. The system of claim 1 wherein said coded signal characteristics are frequencies, and wherein said decoding means comprises means for detecting said frequencies of said coded signal pulses and for providing separate signals in separate channels respectively responsive thereto, and means for generating output signal pulses respectively responsive to said separate signals and corresponding to said initial signal during the respective group of segments thereof.

6. The system of claim 5 wherein said detecting means comprises a plurality of narrow pass filter means respectively tuned to said frequencies.

7. The system of claim 5 wherein said detecting means comprises frequency discriminator means for providing an output signal having amplitude levels respectively corresponding to said frequencies, and threshold detecting means for detecting said levels and for providing said separate signals.

8. The system of claim 1 wherein said coded signal pulse generating means comprises a plurality of pulse generating means each generating a pulse having a different predetermined amplitude in response to the respective output signal.

9. The system of claim 1 wherein said system is a television system, said generating means being camera tube means, said initial signal being a video signal generated by said camera tube means in response to an optical image composed of two contrasting colors, and wherein said converting means is display tube means.

10. In an information transmission system including means for generating an initial time-based pulsed electrical signal conveying the information to be transmitted, means for converting a time-based electrical signal into output information, and means for transmitting a time-based electrical signal from said generating means to said converting means: transmission time-bandwidth reduction means comprising means for generating sampling pulses having a repetition frequency no higher than the highest frequency of said initial signal pulses, a plurality of parallel circuits coupled to said initial signal pulse generating means, means in said circuits for providing a fixed ratio between the amplitude levels of the pulses in said circuits with the pulses having different amplitude levels, respectively, means in said circuits for providing a fixed phase relationship between the pulses in said circuits with said pulses being respectively phase-displaced by a fraction of the period of said sampling pulses and with the denominator of said fraction being the number of said circuits, means coupled to said circuits for adding the amplitudes of the phase-displaced pulses therein thereby providing an output signal having a number of levels which is equal to the fractorial of the number of said circuits, switching means coupled to said adding means and to said sampling pulse generating means for gating segments of said output signal in response to said sampling pulses thereby to provide output pulses respectively having the amplitude level of said output signal at the respective segment, amplitude level storage means coupled to said switch means and to said sampling pulse generating means for storing the amplitude level of each said output pulse for the period of said sampling pulses thereby to provide coded signal pulses, said storage means being coupled to said transmitting means; and means coupling said transmitting means to said converting means and including means for decoding said coded signal pulses thereby to provide a time-based signal for said converting means corresponding to said initial signal.

11. In an information transmission system including means for generating an initial time-based pulsed electrical signal conveying the information to be transmitted, means for converting a time-based electrical signal into output information, and means for transmitting a time-based electrical signal from said generating means to said converting means: transmission time-bandwidth reduction means comprising signal encoding means coupling said generating means to said transmitting means and including means for detecting the amplitudes of successive segments of said initial signal, said segments being equally time-spaced by intervals no longer than the minimum duration of said signal pulses, and means for generating a coded signal pulse in response to each one of successive groups of said segments, each of said groups having the same predetermined number of said segments, each one of said coded signal pulses having a duration equal to that of a said group and a predetermined amplitude level in response to the amplitudes of the segments of a respective group, there being a different amplitude level for each different combination of segment amplitudes in a respective group; and means coupling said transmitting means to said converting means for decoding said coded signal pulses and including threshold level detecting means coupled to said transmitting means and having a plurality of output circuits for detecting the amplitude levels of said coded signal pulses and for providing separate output signals in respective output circuits responsive thereto; means for generating clock pulses having a period equal to the duration of a said group, a first plurality of AND gates each having an output circuit, circuit means coupling said threshold detecting means output circuits to said AND gates for respectively applying said output signals thereto, said clock pulse generating means being coupled to said AND gates for applying gating pulses thereto whereby an output pulse is provided in the output circuit of the respective AND gate which has said output signal applied thereto, a plurality of bistable multivibrators each having "set" and "reset" circuits and an output circuit, the "set" circuits of said multivibrators being coupled to respective ones of said AND gate output circuits whereby said multivibrators respectively generate binary output pulses in response to said output pulses, a plurality of OR gates having output circuits coupled to the "reset" circuits of said multivibrators, circuit means coupling said AND gate output circuits to said OR gates for applying said output pulses thereto whereby resetting signals are provided for said multivibrators thereby to terminate the binary output pulse of a respective multivibrator in response to a said output pulse which is applied to the "set" circuit of a different one of said multivibrators, and another plurality of AND gates having output circuits coupled to said converting means, said multivibrator output circuits being respectively coupled to said other AND gates for applying said binary output pulses thereto, said clock pulse generating means being coupled to said other AND gates for applying said gating pulses thereto thereby providing in said output circuits thereof an output time-based binary pulsed signal corresponding to said initial signal.

12. The system of claim 11 wherein said clock pulse generating means is coupled to said transmitting means and locked to said coded pulses, and wherein said gating pulses occur in the middle of respective coded pulses.

13. The system of claim 11 wherein the highest one of said coded signal pulse levels is responsive to all of the segments of the respective group being in one state and the lowest one of said coded signal pulse levels is responsive to all of the segments of the respective group being in the opposite state, said lowest level being defined by the absence of a coded signal pulse having a higher level, said threshold detecting means having output circuits equal in number to the number of said coded signal pulse levels less one and respectively detecting the amplitudes of said levels above said lowest level, said first AND gates being equal in number to the number of said levels, respective ones of said first AND gates being coupled to said threshold detecting means output circuits and the remaining AND gate being coupled to all of said threshold detecting means output circuits by inverting means thereby to provide a said output pulse responsive to said lowest level coded signal pulse, said multivibrators being equal in number to the number of said threshold detector means output circuits and having their "set" circuits coupled to the output circuits of said respective ones of said AND gates, said remaining one of said AND gates being coupled to all of said OR gates, said other AND gates being equal in number to said multivibrators, said clock pulse generating means being coupled to said transmitting means and locked to said coded signal pulses, said clock pulse generating means having two output circuits respectively providing "one" and "zero" pulses, narrow gating pulse generating means coupling said "one" output circuit to all of said first AND gates whereby said gating pulses occur in the middle of a respective coded signal pulse, the one of said other AND gates which is coupled to the highest level output circuit of said threshold detector means by a respective first AND gate and multivibrator being coupled to a source of fixed potential, the remaining ones of said other AND gates being respectively coupled to said "one" and "zero" output circuits of said clock pulse generating means.

14. In an information transmission system including means for generating an initial time-based pulsed electrical signal conveying the information to be transmitted, means for converting a time-based electrical signal into output information, and means for transmitting a time-based electrical signal from said generating means to said converting means: transmission time-bandwidth reduction means comprising means for generating a train of sampling pulses having a first repetition frequency which is a multiple at least twice the highest frequency of said initial signal pulses, shift register means having a plurality of storage units, said shift register means being coupled to said generating means and to said sampling pulse generating means whereby said binary pulses are shifted into said shift register means by said sampling pulses, each of said storage units having two output circuits for respectively providing "one" and "zero" binary signals responsive to the binary state of the pulses stored therein, dividing means coupled to said sampling pulse generating means for providing a train of gating pulses responsive to said sampling pulses and having a second repetition frequency which is equal to said first repetition frequency divided by the number of said storage units, a plurality of AND gates equal to the number of combinations of said binary signals and respectively having output circuits, logic circuit means coupling said output circuits of said storage units to said AND gates for applying each different combination of said binary signals to a different one of said AND gates, said dividing means being coupled to each of said AND gates for applying said gating pulses thereto whereby an output signal is provided in the output circuit of the respective AND gate which has said binary signals applied thereto, a plurality of bistable multivibrators each having "set" and "reset" input circuits and an output circuit, said multivibrators respectively generating coded pulses having different predetermined levels, the "set" circuits of said multivibrators being coupled to respective ones of said AND gate output circuits whereby said multivibrators respectively generate said coded pulses in response to said output signals, a plurality of OR gates having output circuits respectively coupled to said "reset" circuits of said multivibrators, logic circuit means coupling said output circuits of said AND gates to said OR gates for applying said output signals thereto whereby resetting signals are provided for said multivibrators thereby to terminate the coded pulse of a respective multivibrator in response to a said output signal which is applied to the "set" circuit of a different one of said multivibrators, said multivibrators having their output circuits coupled to said transmitting means; and means coupling said transmitting means to said converting means and including means for decoding said coded signal pulses thereby to provide a time-based signal for said converting means corresponding to said initial signal.

References Cited

UNITED STATES PATENTS

| | | | |
|---|---|---|---|
| 3,299,204 | 1/1967 | Cherry et al. | 178—6 |
| 2,906,816 | 9/1959 | Kretzmer | 178—6 X |
| 3,128,342 | 4/1964 | Baker | 178—67 X |
| 3,204,029 | 8/1965 | Groff et al. | 178—68 |
| 3,330,909 | 7/1967 | Willson | 178—66 X |

ROBERT L. GRIFFIN, *Primary Examiner.*

W. S. FROMMER, *Assistant Examiner.*